(12) United States Patent
Donderici et al.

(10) Patent No.: US 10,928,543 B2
(45) Date of Patent: Feb. 23, 2021

(54) ELECTRICAL LOG PROCESSING NEAR CASING POINT

(71) Applicant: Halliburton Energy Services, Inc., Houston, TX (US)

(72) Inventors: Burkay Donderici, Houston, TX (US); Luis Emilio San Martin, Houston, TX (US); Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 299 days.

(21) Appl. No.: 14/781,423

(22) PCT Filed: Jul. 31, 2014

(86) PCT No.: PCT/US2014/049194
§ 371 (c)(1),
(2) Date: Sep. 30, 2015

(87) PCT Pub. No.: WO2016/018384
PCT Pub. Date: Feb. 4, 2016

(65) Prior Publication Data
US 2016/0208602 A1 Jul. 21, 2016

(51) Int. Cl.
*G01V 3/38* (2006.01)
*G01V 3/20* (2006.01)
*E21B 47/09* (2012.01)

(52) U.S. Cl.
CPC .......... *G01V 3/38* (2013.01); *G01V 3/20* (2013.01); *E21B 47/09* (2013.01); *G01V 2210/542* (2013.01)

(58) Field of Classification Search
CPC ........... E21B 47/00; E21B 47/09; G01V 3/20; G01V 3/38
(Continued)

(56) References Cited

U.S. PATENT DOCUMENTS 4,335,353 A * 6/1982 Lacour-Gayet .......... G01V 3/24
324/366
4,646,026 A * 2/1987 Chemali .................. G01V 3/24
324/366
(Continued)

FOREIGN PATENT DOCUMENTS

GB 2464593 A 4/2010
WO WO-03/054585 A1 7/2003
(Continued)

OTHER PUBLICATIONS

"European Application Serial No. 14877560.4, Extended European Search Report dated Sep. 16, 2016", 10 pgs.
(Continued)

*Primary Examiner* — Lina M Cordero
(74) *Attorney, Agent, or Firm* — Gilliam IP PLLC

(57) ABSTRACT

Apparatus and techniques are described, such as for obtaining information indicative of a formation resistivity near a casing, such as using an array laterolog apparatus. For example, raw measurements received from a well tool in a borehole near a casing may indicate a resistivity of a geologic formation through which the borehole extends. Any errors or interference in the raw measurements caused by the proximity of the well tool to the casing may be removed to eliminate the casing effect on the raw measurements. In some examples, a signal and formation libraries that include casing specific parameters may be used in conjunction with non-casing optimized signal and formation libraries to perform correction mapping of raw measurements. The corrections and their application to the raw measurements may be based on the position of a well logging tool with respect to a casing termination point.

41 Claims, 16 Drawing Sheets

(58) Field of Classification Search
USPC .................................................................. 702/6
See application file for complete search history.

(56) References Cited

U.S. PATENT DOCUMENTS

| | | | |
|---|---|---|---|
| 5,268,641 A * | 12/1993 | Trouiller | G01V 3/24 324/373 |
| 6,025,721 A | 2/2000 | Vail, III | |
| 6,246,240 B1 | 6/2001 | Vail, III | |
| 6,294,917 B1 | 9/2001 | Nichols | |
| 6,765,387 B2 * | 7/2004 | Prammer | G01V 3/24 324/366 |
| 6,801,039 B2 * | 10/2004 | Fabris | G01V 3/28 324/324 |
| 7,093,672 B2 * | 8/2006 | Seydoux | E21B 7/04 175/24 |
| 8,499,830 B2 | 8/2013 | Alberty | |
| 8,775,084 B2 * | 7/2014 | Rabinovich | G01V 3/38 702/7 |
| 2003/0076107 A1 | 4/2003 | Fanini et al. | |
| 2005/0088181 A1 * | 4/2005 | Barber | G01V 3/28 324/346 |
| 2005/0127917 A1 * | 6/2005 | Barber | G01V 3/20 324/338 |
| 2005/0256644 A1 * | 11/2005 | Xiao | G01V 3/28 702/7 |
| 2006/0125479 A1 | 6/2006 | Chemali et al. | |
| 2009/0192711 A1 * | 7/2009 | Tang | E21B 47/12 702/6 |
| 2009/0198447 A1 * | 8/2009 | Legendre | G01V 1/50 702/11 |
| 2009/0230968 A1 | 9/2009 | Bittar et al. | |
| 2010/0097065 A1 * | 4/2010 | Itskovich | G01V 3/28 324/336 |
| 2010/0277176 A1 * | 11/2010 | Homan | E21B 47/102 324/333 |
| 2010/0277177 A1 | 11/2010 | Alumbaugh et al. | |
| 2011/0083838 A1 | 4/2011 | Labrecque | |
| 2012/0078558 A1 | 3/2012 | Pelegri et al. | |
| 2015/0355372 A1 * | 12/2015 | Bloemenkamp | G01V 3/24 702/7 |
| 2016/0040531 A1 * | 2/2016 | Ramakrishnan | G01V 1/50 702/8 |

FOREIGN PATENT DOCUMENTS

| | | |
|---|---|---|
| WO | WO-2014/081428 A1 | 5/2014 |
| WO | WO-2016-018384 A1 | 2/2016 |

OTHER PUBLICATIONS

Jung, H., et al., "Negative Apparent Resistivity Effect by a Steel Casing Borehole Near Electrical Dipole-Dipole", *15th European Meeting of Environmental and Engineering Geophysics, EAGE*, (2009), 5 pgs.

"International Application Serial No. PCT/US2014/049194, International Search Report dated Apr. 28, 2015", 4 pgs.

"International Application Serial No. PCT/US2014/049194, Written Opinion dated Apr. 28, 2015", 5 pgs.

Hou, Junsheng, et al., "A new multi-frequency triaxial array induction tool for enhancing evaluation of anisotropic formations and its field testing", SPWLA 54th Annual Logging Symposium, Jun. 22-26, 2013, (2013), 1-16.

Hou, Junsheng, et al., "Real-Time Borehole Correction of Multicomponent Induction Data Acquired in OBM Wells: Algorithm and Applications", Petrophysics, 54(2), (Apr. 2013), 14 pgs.

"European Application Serial No. 14877560.4, Office Action dated Sep. 14, 2017", 9 pages.

EP Application Serial No. 14877560.4; EP Office Action; dated Apr. 18, 2018, 7 Pages.

* cited by examiner

ELECTRICAL LOG PROCESSING NEAR CASING POINT

PRIORITY APPLICATION

This application is a U.S. National Stage Filing under 35 U.S.C. 371 from International Application No. PCT/US2014/049194, filed 31 Jul. 2014; which application is incorporated herein by reference in its entirety.

BACKGROUND

Various techniques may be used to evaluate geological formations. For example, measurements may be made using tools located within a borehole such as in support of geophysical and petrophysical exploration or resource extraction. In one approach, an apparent resistivity (or conductivity) of a formation may be evaluated by injecting a current from a location within the borehole into a portion of the formation, and conductively measuring a resulting voltage induced by the current. Such resistivity information may provide a general indication of formation composition or geometry, including providing indicia of invasion or hydrocarbon presence.

An example of this type of borehole resistivity (e.g., "galvanic") measurement tool is an array laterolog, which may include an array of current and monitor electrodes that provide resistivity logging for a variety of relatively shallower or relatively deeper radial depths of investigation. The radial depths of investigation may be controlled by "focusing" the injected current using hardware or software techniques, or a combination of both hardware and software techniques.

In certain instances, reservoirs may be very shallow and close to the cased section of the borehole. The casing may create issues in resistivity logging since such measurement devices have larger range of investigation and their processing depends on use of large measurement windows at each depth. This may cause spurious effects in raw acquired data and processed logs, which increase as the zone of investigation gets closer to the casing, and make obtaining measurements near-casing zones difficult.

DETAILED DESCRIPTION

Apparatus and techniques are described, such as for obtaining information indicative of a formation resistivity using an array laterolog apparatus near a borehole casing. For example, an electrical excitation is coupled from a well tool in a borehole to a geologic formation through which the borehole extends, the excitation coupled through excitation electrodes on the well tool selected according to a specified excitation mode, and induced voltages are received from the geologic formation resulting from the excitation using monitor electrodes selected according to the specified excitation mode. In some examples, a voltage difference between a first pair of monitor electrodes is estimated through use of the induced voltage received through at least one additional monitor electrode.

As will be described below, near casing processing and correction algorithms may be utilized to produce resistivity logs even when raw measurements are taken near casing end points. This methodology may be used to correct both raw inductive resistivity measurements and raw galvanic resistivity measurements obtained near a borehole casing. In an example embodiment, a signal library of modeling results with different casing position and properties may be used as a replacement to other processing methods that do not include casing in the signal library.

In another example embodiment, an iterative algorithm based on a forward model with casing may be used. In yet another example embodiment, the casing effect is accounted on the processed resistivity results as a correction step. In all embodiments, a quality factor or threshold can be used to identify zones in which resistivity cannot be obtained and either ignore and omit such zones, or indicate these conditions, in the logs. Thus, accuracy and operational resistivity range of an array laterolog tool is improved, because the tool is capable of obtaining resistivity information near a casing point as compared to other techniques lacking such capabilities.

Figure 1:
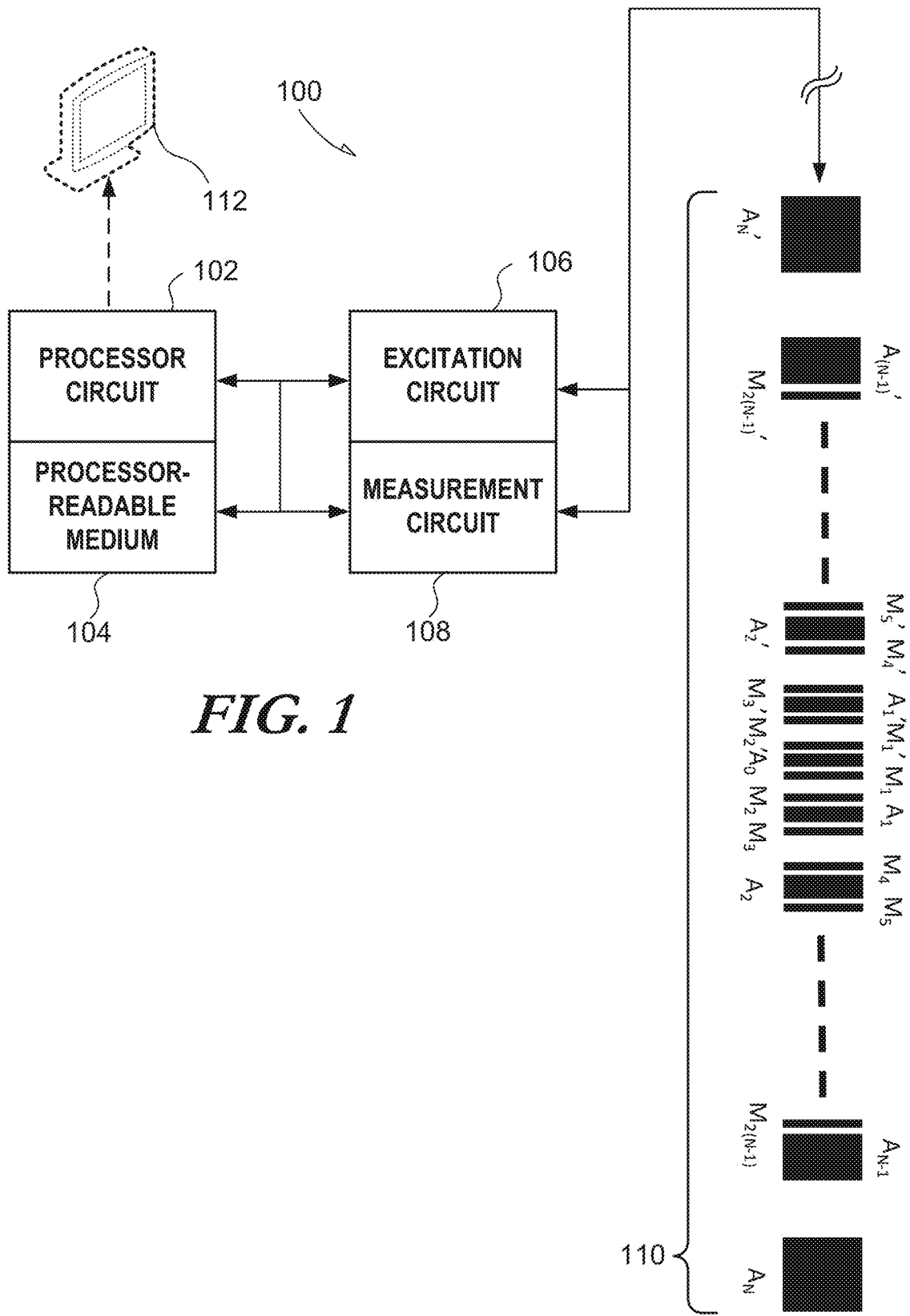
FIG. 1 illustrates an example of an apparatus including an array of current and monitor electrodes, such as for obtaining information indicative of a formation resistivity.

FIG. 1 illustrates an example of an apparatus 100, including an electrode array 110 of current and monitor electrodes, such as for obtaining information indicative of a formation resistivity. Information indicative of a formation resistivity may include any measured or received voltages, currents, electric fields, magnetic fields, or any combination thereof that are obtained by a tool disposed in or near a formation.

For example, an array laterolog tool, such as including the electrode array 110, is generally used to obtain information indicative of a resistivity (or conductivity) of portions of a geologic formation at a variety of radial depths extending laterally outward from the array. Such information from multiple depths may be used to correct for effects related to the presence of borehole and invasion layers, such as for determination of an "apparent" or corrected formation resistivity.

In FIG. 1, the electrode array 110 includes a plurality of ring-shaped electrodes located along a longitudinal axis and extending around the circumference of a laterolog tool body sized and shaped for deployment within a borehole. Other electrode shapes may be used, such as rectangular or button-shaped electrodes. Such electrodes can be arranged or spaced radially around a tool body or otherwise arranged on the tool body.

Figure 9:
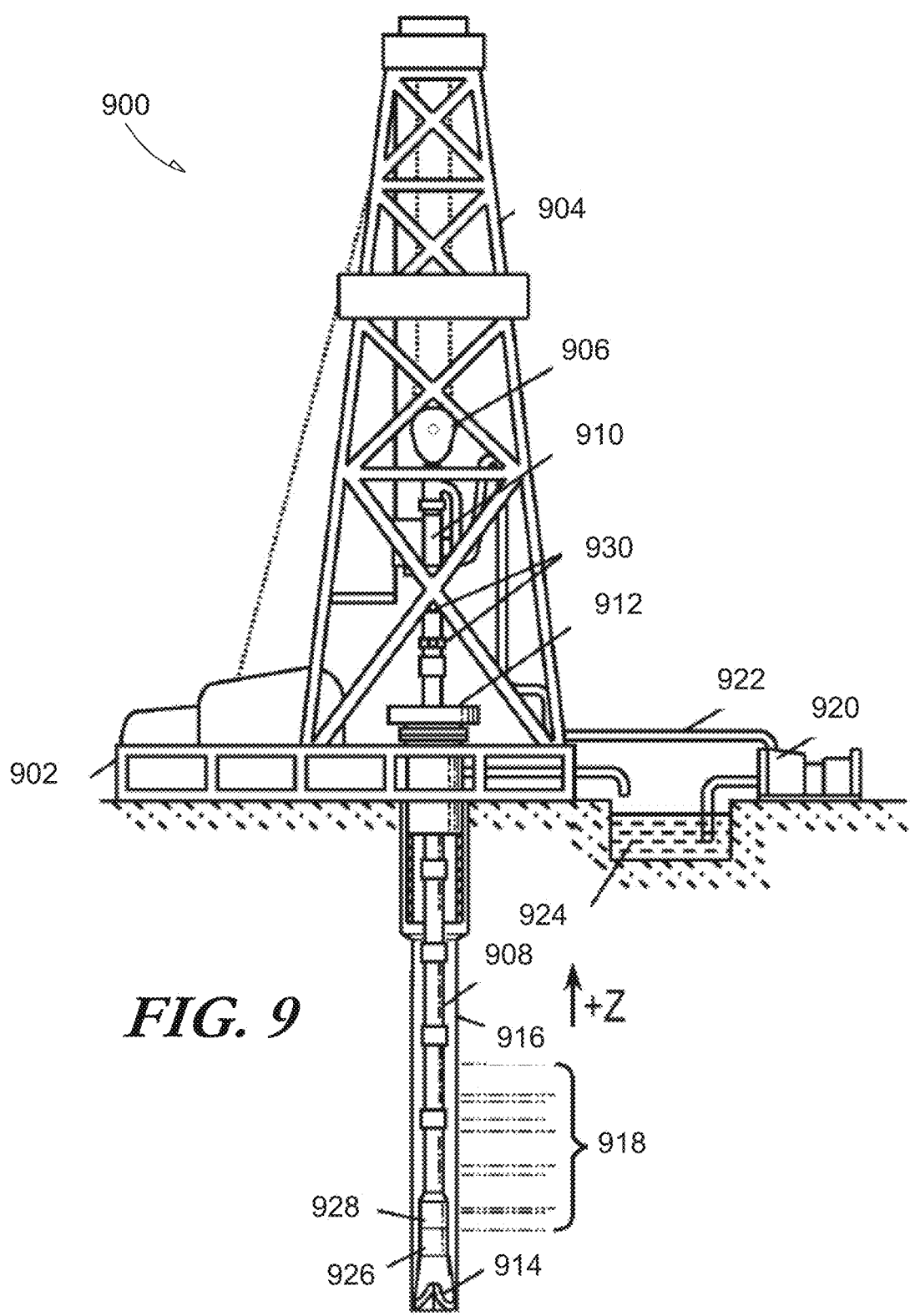
FIG. 9 illustrates an example of a drilling apparatus, such as including a measure-while-drilling (MWD) or log-while-drilling (LWD) capability.
Figure 10:
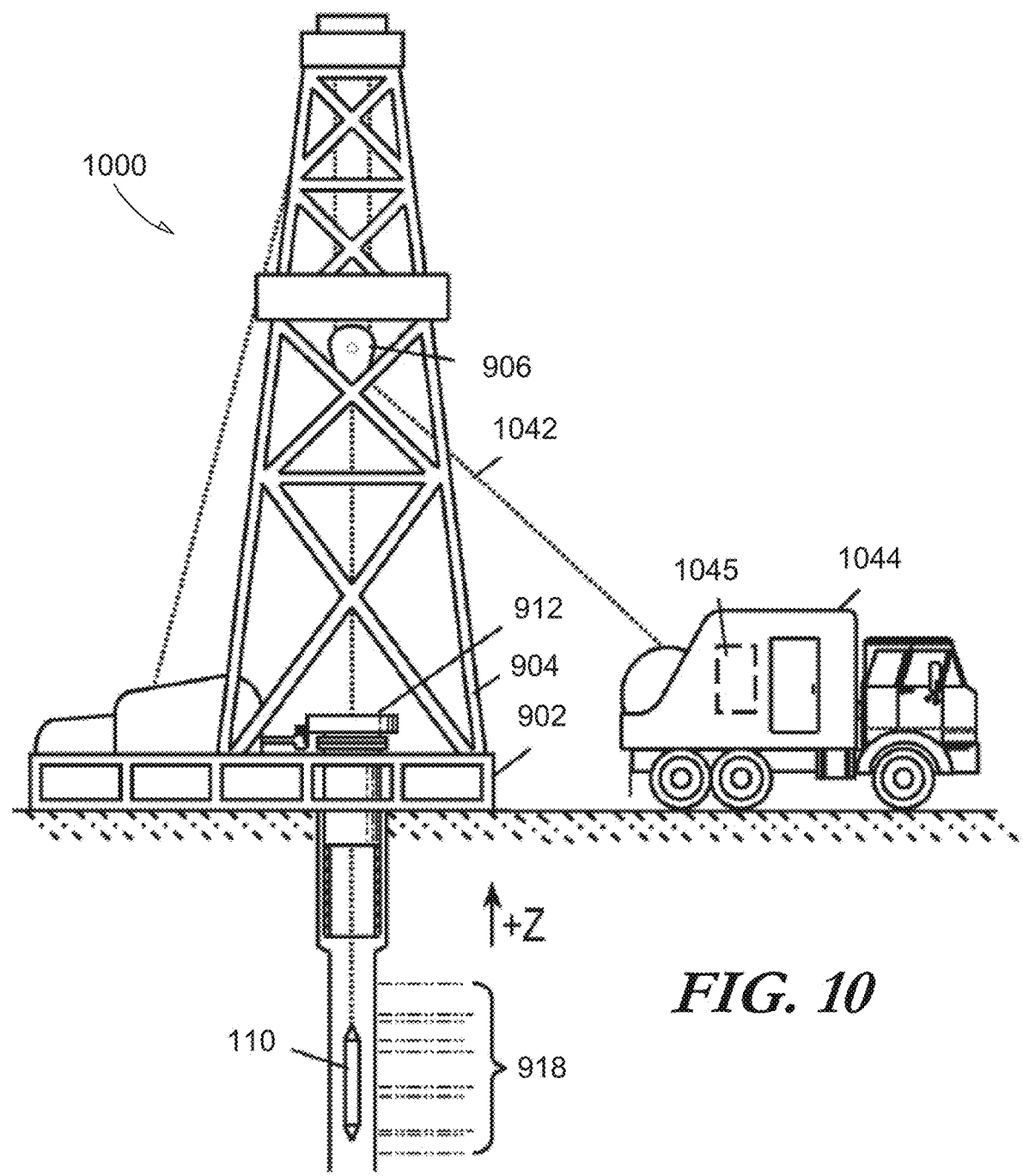
FIG. 10 illustrates an example of a wireline logging apparatus.

The electrode array 110 may be included as a portion of a drill string in a log-while-drilling (LWD) application (e.g., as shown in FIG. 9), or the electrode array 110 may be included as a portion of a wireline sonde (e.g., as shown in FIG. 10). Other configurations may be used, such as including a tubing-conveyed downhole logging configuration.

The electrode array 110 is coupled to an excitation circuit 106 and a measurement circuit 108. The excitation circuit 106 and measurement circuit 108 are controlled by a processor circuit 102 according to instructions stored in a processor-readable medium 104. The processor circuit 102 may be a general purpose processor or a special purpose processor coupled to the excitation circuit 106 and the measurement circuit 108. The processor circuit 102 and processor-readable medium 104 may be located within a tool body or sonde downhole, or as a portion of a surface processing system. For example, the processor circuit 102 may be coupled to a display 112, such as to present information indicative of a formation resistivity to a user, or to provide other information regarding status or control of various portions of the apparatus 100.

The phrase "processor-readable medium" shall be taken to include any tangible non-transitory device which is capable of storing or encoding a sequence of instructions for execution by the machine and that causes the machine to perform any one of the described and/or claimed methodologies. Such a processor-readable medium 104 includes a machine-readable medium or computer readable medium. The term "non-transitory device" expressly includes all forms of storage devices, including drives (optical, magnetic, electric, etc.) and all forms of memory devices (e.g., Dynamic Random Access Memory (DRAM), Flash (of all storage designs, including NAND or NOR topologies), Static Random Access Memory (SRAM), Magnetic Random Access Memory (MRAM), phase change memory, etc., as well as all other structures designed to store information of any type for later retrieval. In an example, one or more of the techniques described herein, such as the techniques shown in FIGS. 7A through 8, may be implemented at least in part as instructions stored on the processor-readable medium 104. Such instructions cause the processor circuit 102 or other portions of the apparatus 100 to perform various operations, such as including portions or entireties of one or more techniques described herein.

In an electrical context, use of the phrase "coupled" or "coupling" may refer to either direct coupling, such as conductive electrical coupling (e.g., as in the example of excitation currents conductively coupled into a formation), or indirect coupling (e.g., wireless, reactive, or electromagnetic coupling). In the mechanical context, "coupled" or "coupling" may refer to a direct mechanical connection, or an indirect mechanical connection through one or more other mechanical portions of an example.

In the illustrative and generalized example of the electrode array 110 of FIG. 1, a centrally-located electrode $A_0$ is designated as a "survey electrode" and is coupled to the excitation circuit 106. The survey electrode may also be coupled to electrodes $(A_1, A_1', \ldots, A_{N-1}, A_{N-1}')$, referred to as "guard electrodes", and electrodes $(A_N, A_N')$, referred to as "return electrodes," which are also coupled to the excitation circuit 106. A respective combination of the 2N guard electrodes and the survey electrode, $A_0$, is used to couple an excitation voltage or current generated by the excitation circuit 106 to a formation from a location within a borehole. The respective combination is established according to a specified excitation mode. Excitation modes may include any variety of voltage or current applied to the excitation circuit 106 with a desired frequency and amplitude.

In many examples, an excitation current injected into the formation using the excitation electrodes $A_0$ and $A_1$, $A_1', \ldots, A_N, A_N'$ will induce respective voltages (e.g., received voltages) which are received using one or more monitor electrodes, such as the 4N-4 monitor electrodes $(M_1, M_1', M_2, M_2', \ldots, M_{2(N-1)}, M_{2(N-1)}')$ shown in the illustrative example of the electrode array 110. The monitor electrodes may be coupled to a measurement circuit 108. The measurement circuit 108 may receive voltages signals from the monitor electrodes that correspond to the voltages induced in response to the specified current excitation mode. As discussed further below, a hardware focusing technique, a software focusing technique, or a combination of hardware- and software-based focusing techniques may be used, to obtain information indicative of formation resistivity corresponding to a variety of radial depths within the formation near a casing.

Figure 2:
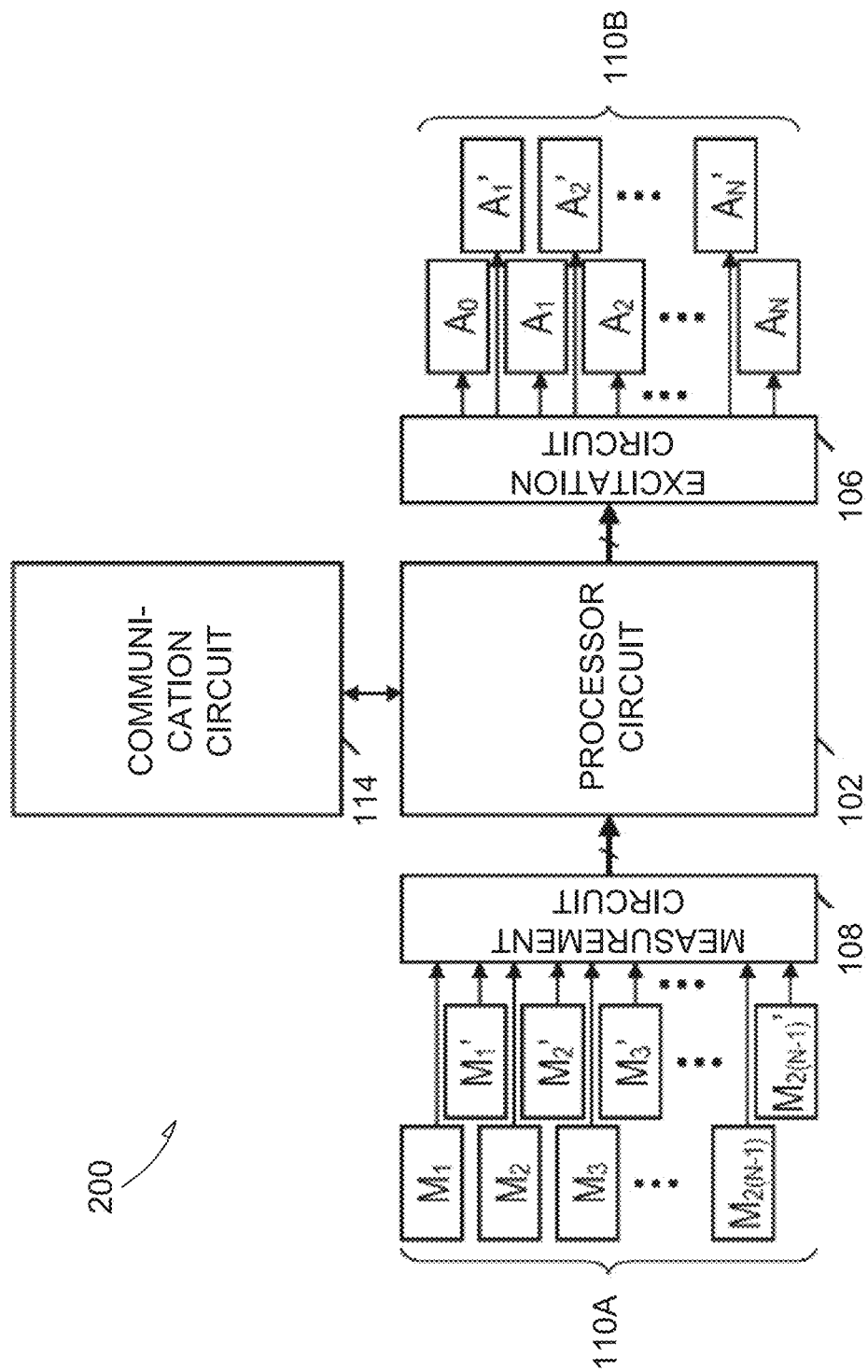
FIG. 2 illustrates an example of an apparatus including an array of current and monitor electrodes, such as for obtaining information indicative of a formation resistivity.

FIG. 2 illustrates an example of an apparatus 200, including an array of excitation electrodes 110B, $A_0$ and $A_1$, $A_1', \ldots, A_N, A_N'$, and an array of monitor electrodes 110A, $M_1, M_1', M_2, M_2', \ldots, M_{2(N-1)}, M_{2(N-1)}'$, similar to the example 110 of FIG. 1, such as for obtaining information indicative of a formation resistivity. As discussed in the example of FIG. 1, the excitation electrodes 110B may be coupled to respective channels of an excitation circuit 106, and may be independently controlled by a respective current source included within the excitation circuit 106. As one example of such, respective symmetrically-located current electrodes such as $A_N$ and $A_N'$ may be conductively coupled together to establish a common potential at the respective symmetrically-located electrodes.

In some examples, techniques are used to facilitate hardware or software focusing. For example, respective currents injected between respective pairs of excitation electrodes 110B may be injected at different respective frequencies of excitation. In this manner, a current injected from a particular combination of excitation electrodes 110B may be discerned from other currents. In one approach, the respective frequencies of such excitation currents are staggered in a non-harmonic relationship, but are closely-enough spaced so that a frequency dependence of formation parameters does not significantly impact a resulting resistivity estimate.

Similarly, the monitor electrodes 110A may be coupled to a measurement circuit 108. For example, the measurement circuit 108 may include respective digital-to-analog converters, filters, or other signal conditioning circuitry, such as to conductively obtain signals independently from each of the monitor electrodes 110A, $M_1$, $M_1'$, $M_2$, $M_2'$, ..., $M_{2(N-1)}$, $M_{2(N-1)}'$. Similar to an example above related to the excitation electrodes 110B, respective symmetrically-located monitor electrodes such as $M_{2(N-1)}$ and $M_{2(N-1)}'$ may be conductively coupled together. In an example, adjacent monitor electrodes, such as M1 and M2, may be coupled to a differential voltage amplifier or detector, such as configured to provide information indicative of a voltage difference between the adjacent monitor electrodes.

The measurement circuit 108 may include or may be coupled to one or more comparator circuits that may be used to determine whether to use actual measurements for a particular electrode combination in a particular excitation mode, or to trigger use of an estimation or approximation technique when an electrode combination measurement may be unreliable, such as discussed further below.

The processor circuit 102 may be coupled to a communication circuit 114. The communication circuit 114 may include one or more of a wireless transmitter, receiver or transceiver, and may use an inductive, radiative (e.g., electromagnetic), or acoustic (e.g., mud pulsing) communication scheme. The communication circuit 114 may use other techniques to transmit or receive information, such as a fiber-optic or other optical communication scheme from the processor circuit 102 to a data receiving apparatus, such as display 112 of FIG. 1.

In an illustrative example, the apparatus 200 may be located downhole, such as included as a portion of an MWD/LWD logging system or as a portion of a wireline sonde. Alternatively, or in addition, the processor circuit 102 may be located on the surface. The processor circuit 102 may be communicatively coupled to one or more of the excitation circuit 106 or measurement circuit 108 to obtain information indicative of formation resistivity. The processor circuit 102 may provide processing capability to determine one or more measurement estimates related to or in support of an apparent formation resistivity determination.

Figure 3A:
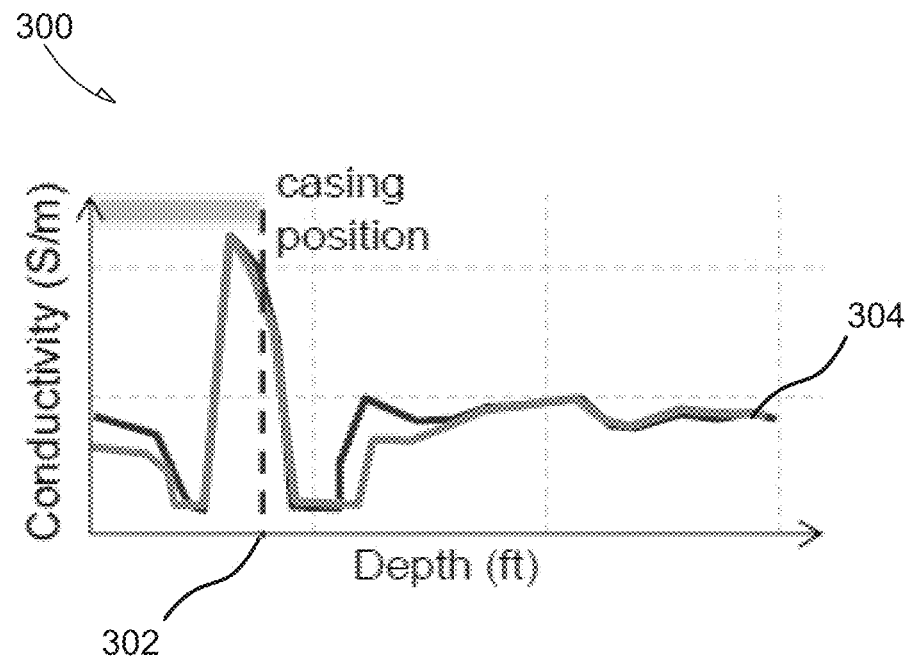
FIG. 3A illustrates an example graph of a casing-effect on an uncorrected conductivity log near a casing termination point.

FIG. 3A illustrates an example graph 300 of a casing-effect on an uncorrected conductivity log near a casing termination point 302 in a borehole. The uncorrected conductivity log may be obtained by measuring conductivity readings at various depths in the borehole. The casing termination point 302 is depicted as a vertical dashed line indicating the deepest cased point in the borehole. The formation conductivity measurement 304 indicates measured resistivity of the formation with respect to a depth in the borehole. The formation conductivity measurement 304 indicates resistivity readings in the casing to the left of the vertical dashed line. The formation conductivity measurement 304 indicates resistivity readings that were obtained beyond the casing termination point are to the right of the vertical dashed line. Raw measurements obtained near the casing may be distorted by the presence of the casing. By determining the exact location of the casing termination point along the conductivity data 304 the distortion in the measured conductivity readings caused by the casing may be corrected.

Figure 3B:
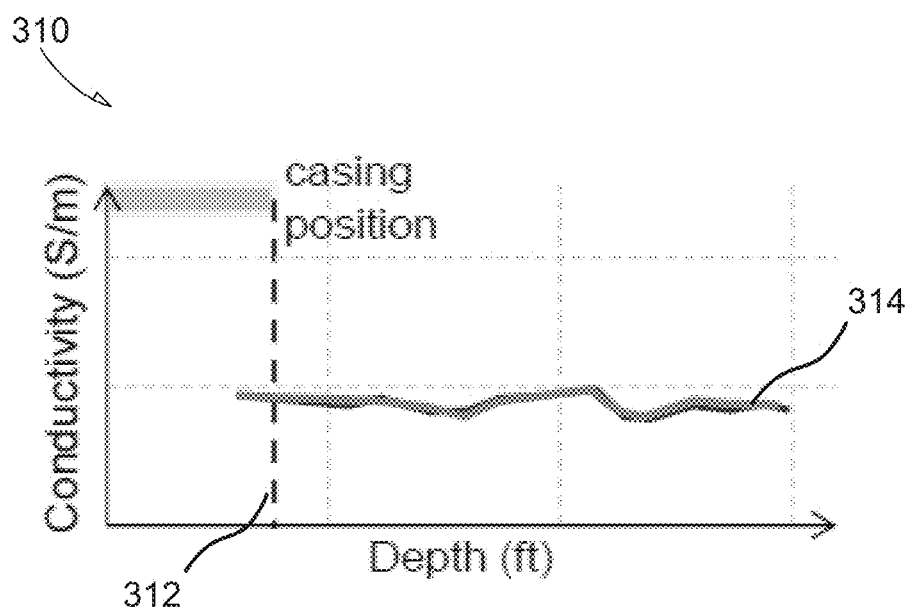
FIG. 3B illustrates an example graph of a corrected conductivity log near a casing termination point.

FIG. 3B illustrates an example graph of a corrected conductivity log 310 near a casing termination point 312 corresponding to the same formation that was depicted in FIG. 3A. The casing termination point 312 is depicted as a vertical dashed line indicating the deepest cased point in the borehole. The conductivity data line 314 indicates resistivity readings in the casing to the left of the vertical dashed line. Readings obtained by a measurement tool obtained while the tool is completely inside the casing may be ignored or discarded. The conductivity data line 314 indicates resistivity readings outside of the casing to the right of the vertical dashed line. The distorted raw measurements obtained from locations near the casing may be corrected to eliminate the distortion. In an example, after the raw measurements are obtained they may be processed with techniques that include: skin effect correction, borehole correction, software focusing and radial profiling. When a well logging tool is near a borehole casing the electric and magnetic fields around the tool are affected, which may perturb the raw measurements and also any results of the processing steps on the raw measurements. In order to account for the casing, some or all of the processing steps may be adjusted to account for the casing effect. Casing corrections may be applied before or after any of the processing steps.

In an example, the electrode array 110 shown in FIG. 1 may be operable using a variety of different excitation modes to obtain downhole raw measurements. Raw measurements received from respective monitor electrodes (e.g., received voltages, currents, electric fields or magnetic fields) in the various excitation modes may then be corrected or otherwise processed to eliminate any distortion caused by the casing.

Figure 4A:
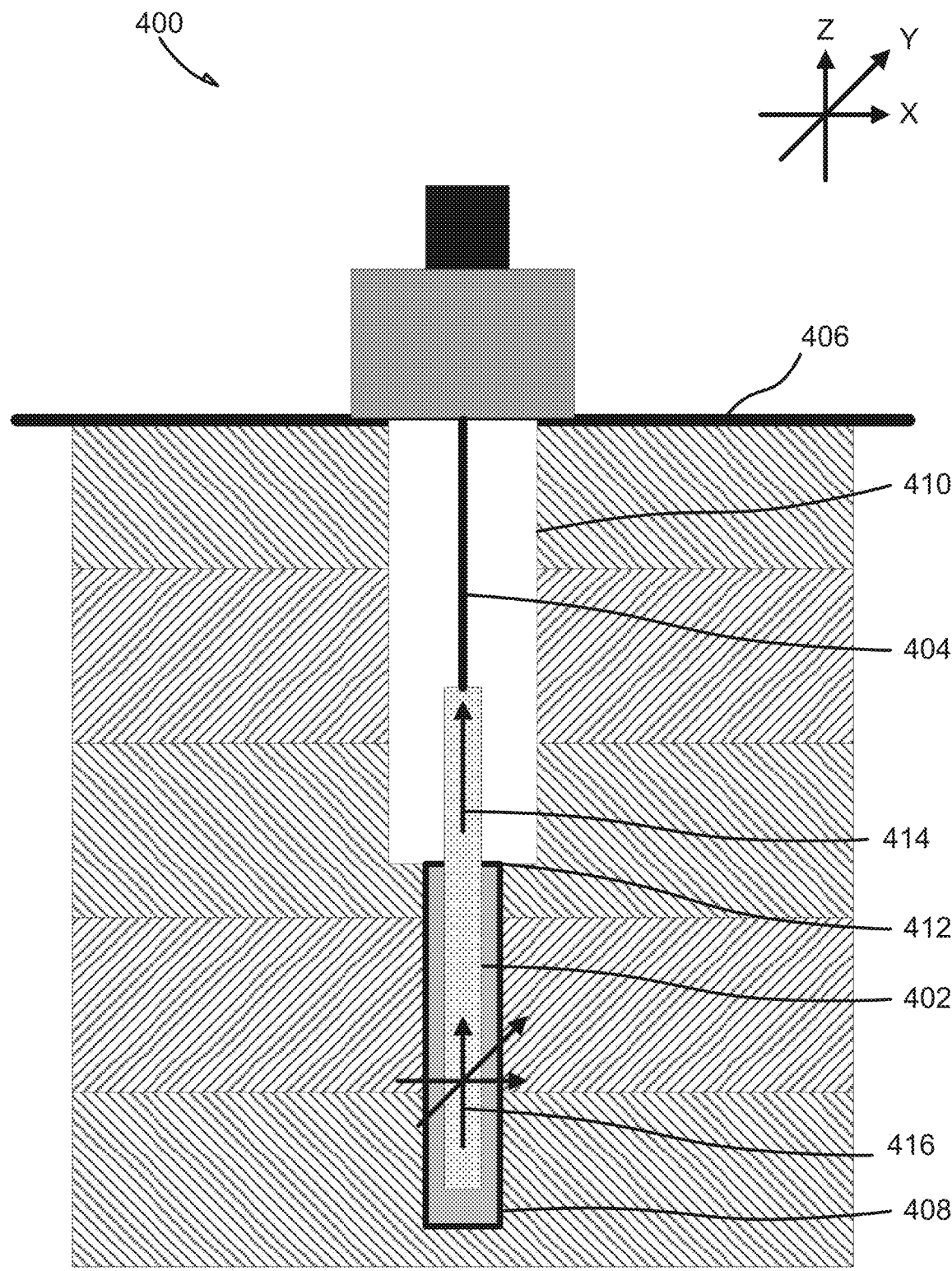
FIG. 4A illustrates an example of a logging apparatus, such as including a wireline or slickline capability.
Figure 4B:
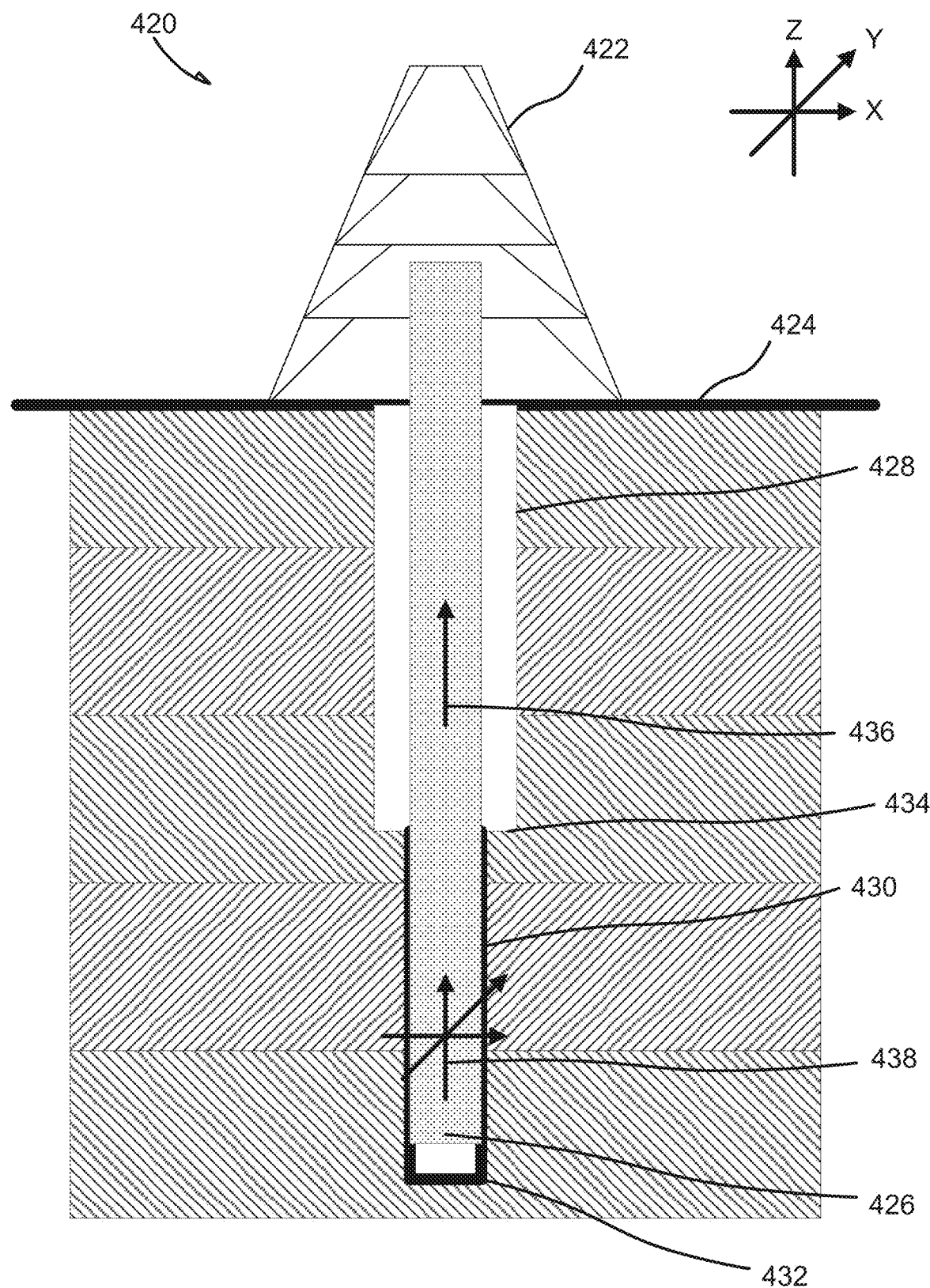
FIG. 4B illustrates an example of a logging apparatus, such as including a measure-while-drilling (MWD) or log-while-drilling (LWD) capability.
Figure 4C:
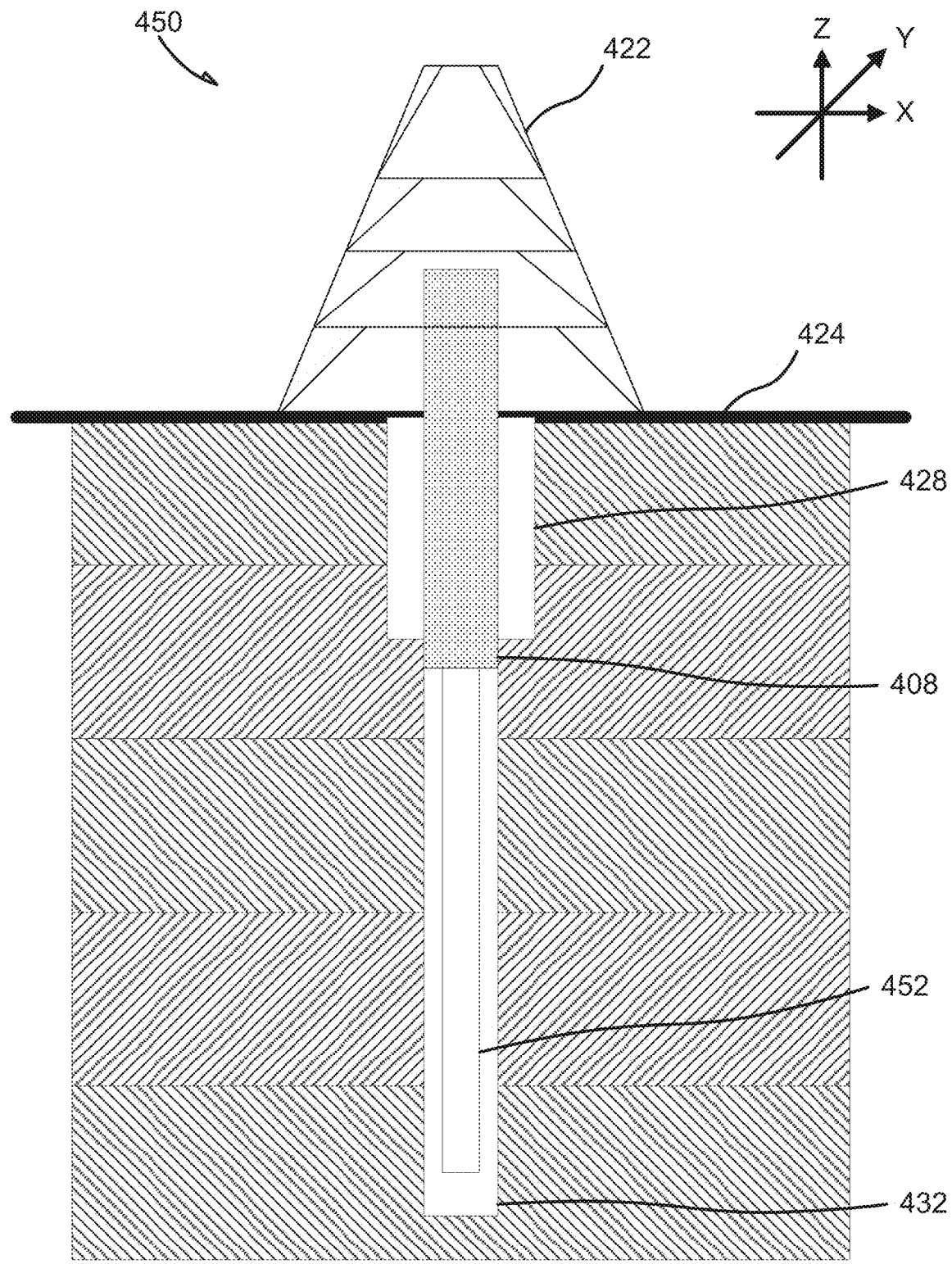
FIG. 4C illustrates an example of a logging apparatus, such as including a through-bit logging capability.

FIGS. 4A through 4C illustrate various examples of applications where raw borehole measurements may be obtained and corrected to eliminate any casing distortion in the raw measurements.

FIG. 4A illustrates an example of a logging apparatus 400, including a wireline or slickline capability. In an example wireline logging application, a logging tool 402 is lowered on a wireline cable 404 that provides a mechanical mechanism to lower the tool from a surface 406 into a borehole 408. The wireline cable 404 also carries the communication and power to the logging tool. In the wireline application, tool depth information can be obtained by measuring the length of the cable 404 that has been lowered through the casing 410 and also applying a correction to account for stretching of the cable due to tool weight. Additionally, the information about the casing 410, such as a casing OD, a depth of casing start, and a casing termination point 412, may also be known or obtained independently from the logging operation. These inputs may be provided to a processor circuit configured with a processing algorithm to correct for any casing interference near the casing termination point 412.

The techniques discussed herein may also be applied to slickline or monocable logging, where very little or no power or communication line with the surface 406 is available. In these examples, a relative position of the casing and tool depth may be obtained by correlating the time information at the surface and in the tool after tool is brought back to the surface, and utilized for to correct the data after logging. If correction in real time is desired a more complicated method can be used. For example, the relative casing position may be inverted from the resistivity logs either through an optimization process or through comparison of the signals with a threshold. This optimization process may also include a database of forward simulations with different casing parameters in different formations.

The logging tool 402 may include a single-component induction tool (or conventional induction tool) that consists of at least one z-directed magnetic dipole transmitter and one z-directed magnetic dipole receiver 414, or a multi-component induction tool may include x-directed, y-directed, and z-directed magnetic dipoles 416. The logging tool 402 may obtain raw measurement data while enclosed by the casing 410, while partially enclosed in the casing 410 and partially beyond the casing termination point 412 (e.g., spanning the casing termination point), or completely outside of the casing 410. In an example, a logging tool 402 that is a distance of approximately twice its length past the casing termination point 412 may be considered to be in a measurement window that is not affected by the casing. The length of the logging tool may be defined as the farthest distance between antennas of the tool (for induction resistivity) or a farthest distance between electrodes of the tool (for galvanic resistivity). Logging measurements, e.g., raw measurements, obtained from window locations where the logging tool 402 is within a measurement window that is less than twice the length of the logging tool 402 may benefit from the application of processing to remove casing interference. The removal of the casing interferences may be calculated to obtain a casing-corrected measurement.

FIG. 4B illustrates an example of a logging apparatus 420, such as including a measure-while-drilling (MWD) or log-while-drilling (LWD) capability. The correction techniques for near casing data logging discussed herein may also be used with logging while drilling (LWD) applications. In an example, a drilling rig 422, on a surface 424, lowers a bottom-hole assembly 426 though a casing 428. The bottom-hole assembly 426 may include resistivity logging tools that can obtain raw measurements during the drilling operation in an uncased portion 430 of a reservoir 432 (e.g., an open hole). The obtained logging measurement can be corrected, processed, and utilized in real time (e.g., during drilling) to guide and optimize the drill path.

In a LWD application, a depth of the bottom-hole assembly 426 may be determined through measurement of the known lengths of pipe as they are connected to a drilling stack at the surface 424. However, due to the weight of the drilling pipe and complex mechanical interactions in the stack, an uncertainty in a depth of the logging tool may exist even when accelerometers are used to measure the location of the bottom-hole assembly 426. In this scenario, where the exact location of a casing termination point 434 relative to the logging tool is uncertain, inversion of the relative casing position along with the processing or correction of resistivity data with respect to the casing may be performed.

The bottom-hole assembly 426 may include a single-component induction tool (or conventional induction tool) that consists of at least one z-directed magnetic dipole transmitter and one z-directed magnetic dipole receiver 436, or a multi-component induction tool may include x-directed, y-directed, and z-directed magnetic dipole transmitters and receivers 438.

FIG. 4C illustrates an example of a logging apparatus 450 including a through-bit logging capability. In an example of through-bit logging, a relatively thin tool stack 452 is passed through a bit 408. The bit 408 being configured for this type of through-bit logging. In this example, through-bit resistivity, the effect of the bit and all the metallic parts of the drilling collar and casing, if present, must also be removed from the logs to obtain an accurate resistivity measurement of the formation around the reservoir 432. This removal can be done in a manner similar to the removal of just the casing alone as described herein. It is contemplated that the ideas disclosed herein may be utilized for metallic (conductive), insulating (resistive), inductive, or any other type of casing that may be used.

Figure 5A:
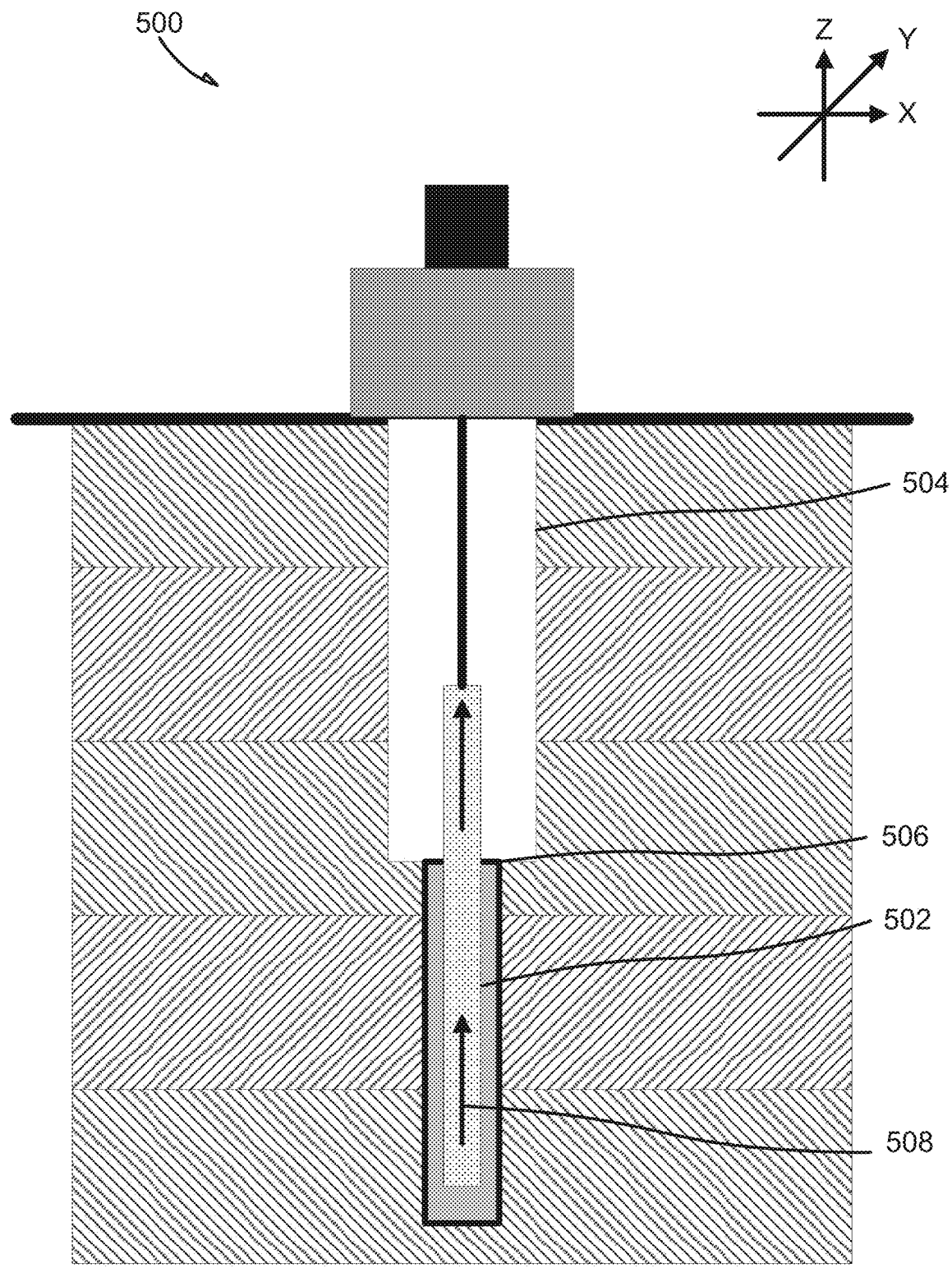
FIG. 5A illustrates an example of a single-component tool apparatus.
Figure 5B:
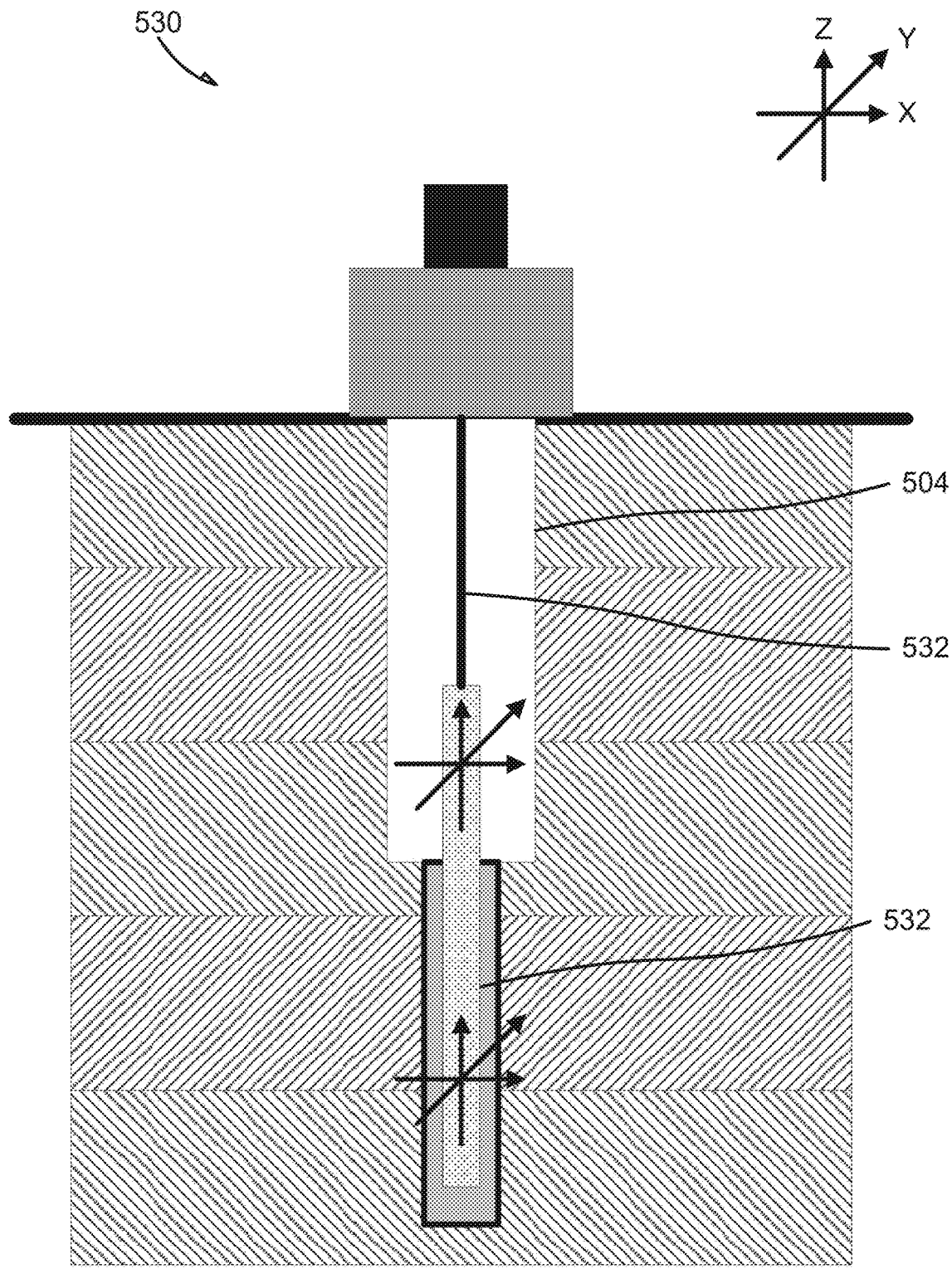
FIG. 5B illustrates an example of a multi-component tool apparatus.
Figure 5C:
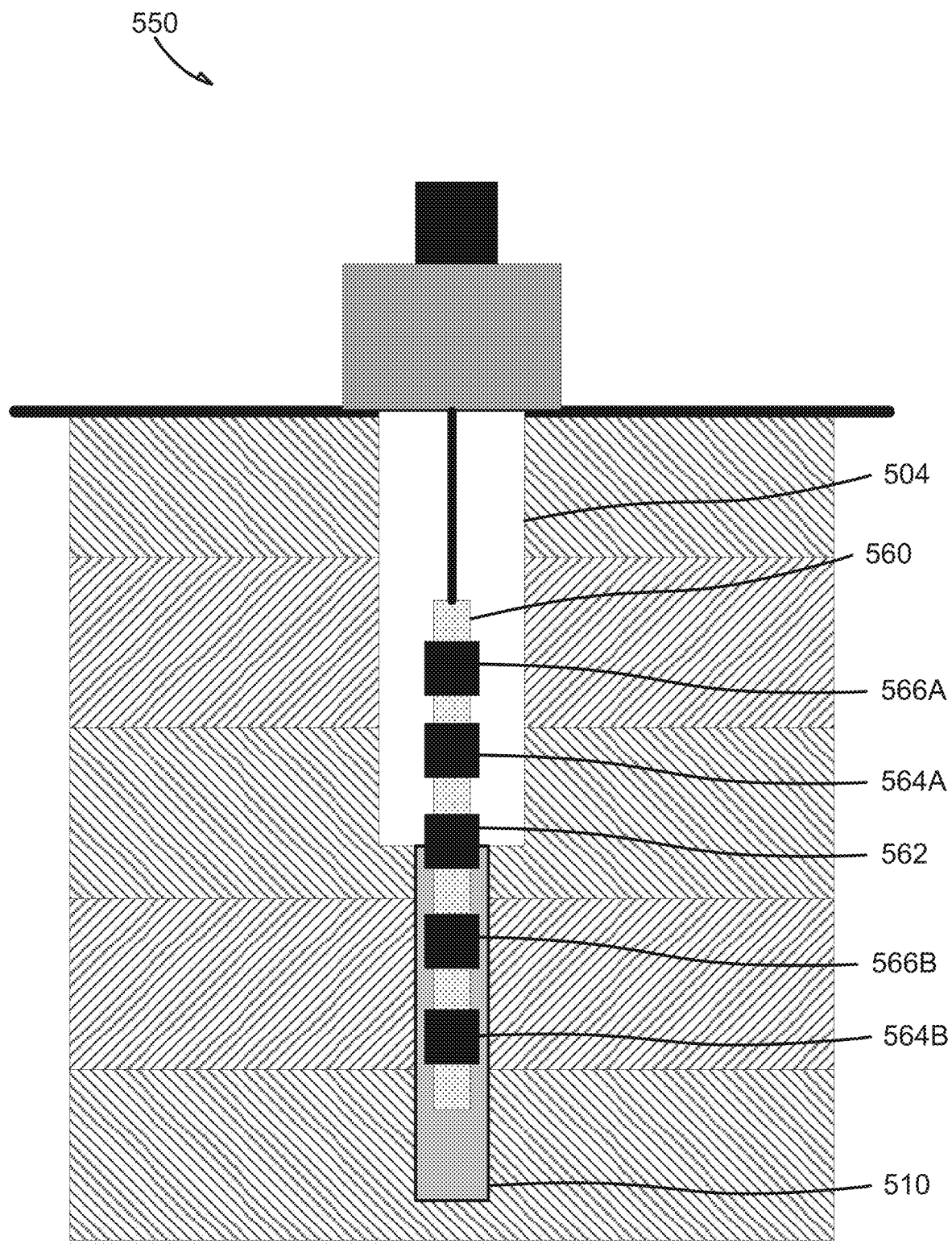
FIG. 5C illustrates an example of a galvanic tool apparatus.

FIGS. 5A through 5C illustrate examples of different tools with which the electrical log processing near casing point techniques may be applied.

FIG. 5A illustrates an example of a single-component tool apparatus 500. A single-component induction tool 502 (or conventional induction tool) may include at least one z-directed magnetic dipole transmitter and one z-directed magnetic dipole receiver. The depth of investigation of the tool 502 may depend on the spacing between the transmitter and the receivers. The depth of casing 504 and the casing termination point 506 may be determined in order to obtain a profile of resistivity radially around the borehole and to correct for any interference created by the casing 504.

The tool 502 may include an array tool that includes a multitude of spacing disposed along the z-axis direction 508 of the tool 502. Such tools are called "array tools".

FIG. 5B illustrates an example of a multi-component tool apparatus 530. A multi-component induction tool 532 may include x-directed, y-directed, and z-directed magnetic dipoles. The multi-component induction tool 532 may be used to compute electrical anisotropy parameters of the formation. The three dipoles that make up the multi-component may or may not be collocated.

After the raw measurements are obtained, they are passed through multiple processing steps which consist of calibration, temperature correction, borehole correction (BHC) and inversion. In both steps of the BHC and vertical inversion, resistivity anisotropy parameters such as horizontal and vertical resistivity (Rh and Rv) may be calculated. The effect of casing may be dealt with in similar manner to the single-component tool 500 of FIG. 5A.

FIG. 5C illustrates an example of a galvanic tool apparatus 550. A galvanic tool 560 may include a multitude of electrodes which may have different roles. For example, the electrodes may include a guard electrode 566A, a measure electrode 564A or a current electrode 562. The current electrode 562 injects the current into the formation 510 while guard electrodes 566A prevent the current from being shorted through the borehole regardless of the layering effects. A measure electrode 564A is used to measure the voltage as an indication of the resistivity of the formation.

Guard electrode operation is established through a process called focusing where the current through the borehole is controlled to be approximately zero. If the focusing is done through hardware, it is called hardware focusing. If the focusing is done through software, it is called software focusing. Similar to induction type of tools, galvanic tools are also affected by the presence of a near-by casing 504. Focused (for software/hardware focusing) or non-focused (for software focusing) measurements may be corrected for the casing effect.

Figure 6:
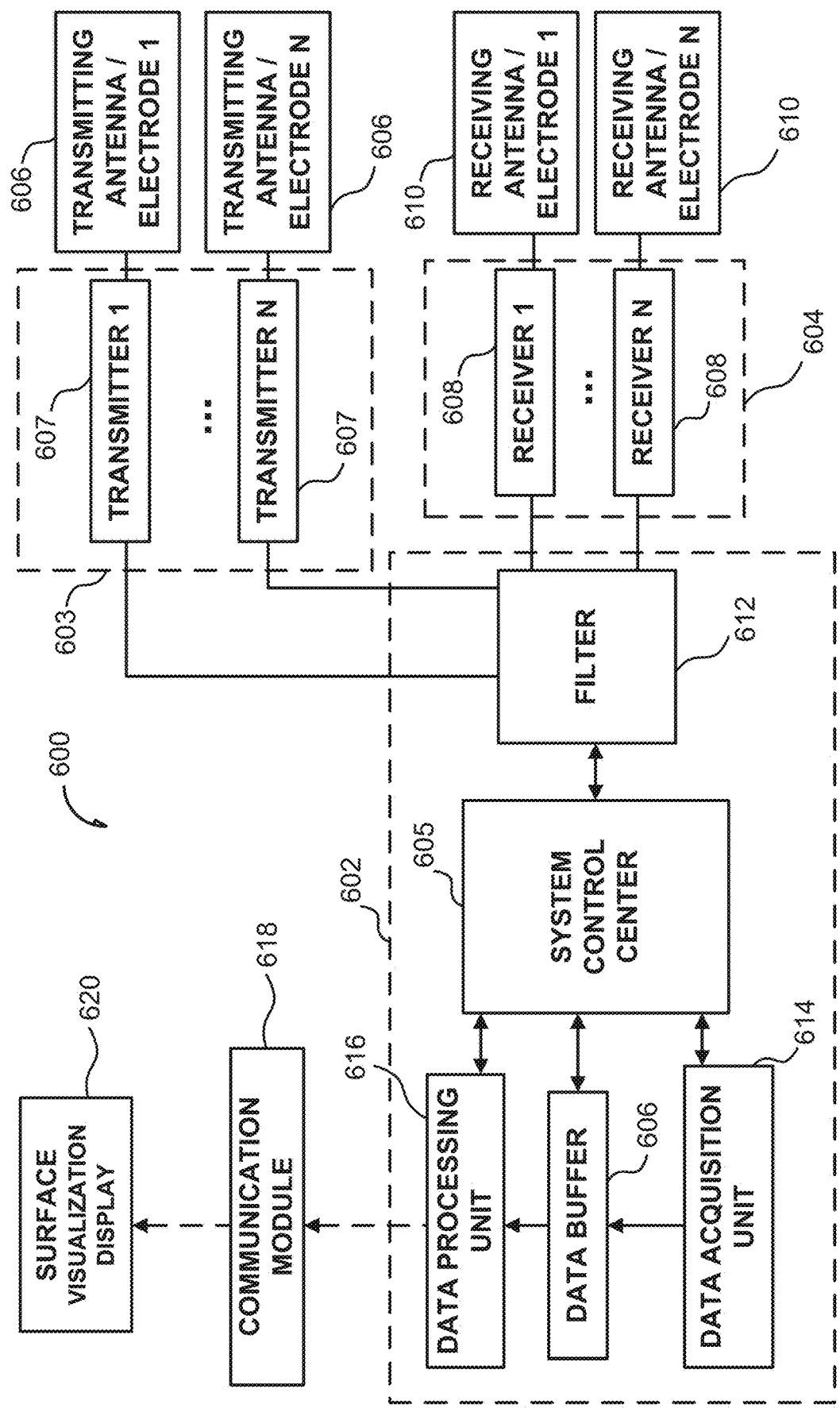
FIG. 6 illustrates an example signal acquisition system, depicted in block diagram form.

FIG. 6 illustrates an example signal acquisition system 600. The system 600 may include a processor circuit 602, an excitation circuit 603, and a measurement circuit 604. The processor circuit 602 includes a system control center 605 that may include a processor-readable medium. The excitation circuit 603 and the measurement circuit 604 may include one or more sets of transmitter and receiver pairs, respectively. For example, the system 600 may include apparatus 200 of FIG. 2. The transmitters 607 are activated by a system control center 604 either sequentially or in parallel. Each transmitter 607 may operate at the same frequency, or different frequencies based on the environment the system 600 is operated in. Each transmitter 607 is coupled to a transmitting antenna or electrode 606. A time-pulse-based acquisition may also be used. Transmitters 607 may be coil, tilted-coil, inductance sensor, reluctance sensor, electrode, toroid, or a wire antenna.

The signal that is generated by each transmitter 607 interacts with the formation and creates a signal that is received at corresponding receivers 608. Similar to the transmitters 607, the receivers 608 may be coupled to a receiving antenna or electrode 610, e.g., coil, tilted-coil, inductance sensor, reluctance sensor, electrode, toroid, or a wire antenna.

The received signals may be filtered, for example through an analog band-pass filter 612, included in the processor circuit 602, to avoid aliasing effects. The received signals may be received at the system control center 605 and digitized by a data acquisition unit 614 that may include an analog-to-digital (A/D) converter. The received signals and digitized data are stored in data buffer 606 and used in the subsequent processing steps, either downhole, or at the surface. A data processing unit 616 may receive the digitized data from the system control center 605 or the data buffer 606 and perform one or more correction or analysis techniques. For example, the data processing unit 616 may include a signal library that may be used to filter out errors in the received signals due to interference from a nearby casing during logging.

A telemetry communication module 618 may be used to transfer the data from the processor circuit 602 to a visualization unit 612. For example, the processor circuit 602 may be included in a downhole tool linked to the surface by a wireline connection provided by the communication module 618. The visualization unit 620 at the surface may receive data from the communication module 618, and include a display to be utilized used to view the produced data to make petrophysical or geophysical interpretation for drilling or production decisions.

Figure 7A:
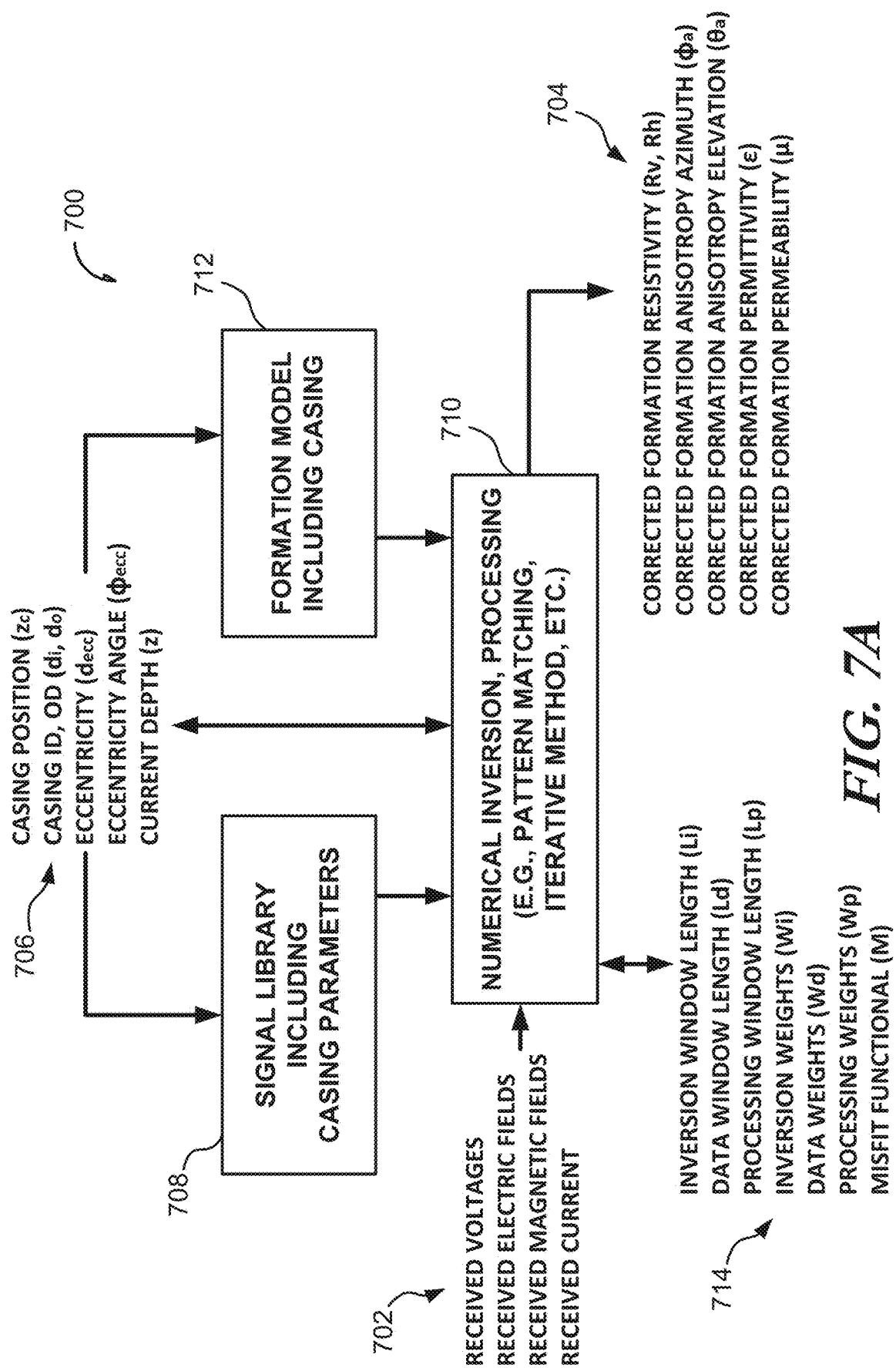
FIG. 7A illustrates an example of a correction technique, such as a method, including a data processing workflow to correct raw measurements.

FIG. 7A illustrates an example of a correction technique 700, such as a method, including a data processing workflow to correct raw measurements. The correction techniques described herein may be implemented within a processing circuit or computer system using a set of instruction stored in a computer readable medium. For example, the apparatus 100 of FIG. 1 or the signal acquisition system 600 of FIG. 6 may include the set of instructions and be configured to perform the correction techniques. The correction technique 700 may begin with received raw measurements 702, such as voltages, currents, electric or magnetic fields, or any combination thereof, being obtained by one or more receivers (e.g., electrodes or antennas) of a well logging tool. These raw measurements 702 will be processed to yield casing-corrected formation properties 704 with any casing interference removed. Casing-corrected formation properties 704 may include formation resistivity (Rv, Rh), formation anisotropy azimuth ($\phi a$), formation anisotropy elevation ($\theta a$), formation permittivity ($\varepsilon$), or formation permeability ($\mu$). Additionally, well information 706 may be provided prior to obtaining the raw measurements 702, or determined during measurement, numerical inversion or processing activities. Well information 706 may include casing position (zc), casing ID, OD (di, do), eccentricity (decc), eccentricity angle ($\varphi ecc$), or current depth (z).

The data processing workflow may be based on a signal library 708 that includes modeled raw measurements as a function of all possible formation models or a representative set of formation models, as well as the casing models. The signal library 708 may include a standard formation library expanded to including casing parameter dimensions such as relative casing position (zcrel), casing ID and OD (di, do), tool eccentricity in casing (decc) and eccentricity angle. In an example, a relative casing position is defined as the casing end position (zc) relative to the current tool depth reference (z), where zcrel=zo−z.

In the data processing workflow, a numerical inversion process 710 is utilized to measure the difference between the received raw measurements 702 data and modeled measurements in the signal library 708, which includes casing parameters, and determine the model with the least difference. The difference between the received raw measurements 702 and the modeled measurements may be calculated with an application of a cost function. In least squares type inversions, a cost function may be defined as the weighted squared sum of all individual channels. Each channel in the cost function may or may not be normalized. An interpolation may be used to calculate the models that fall in between the existing models in the signal library.

In an example, a formation and casing model 712 may be used in the inversion process 710 to produce modeled measurements, instead of or along with pre-calculated values in the signal library 708. Parameters of inversion and any subsequent processing may be selected appropriately to minimize effects of casing.

Measurement windows (e.g., ranges or depths (z) along a boreholes) may be utilized as part of the numerical inversion process 710 to incorporate information from multiple depths. Various windows may be selected at each depth and moved along with the current depth being inverted. An inversion window may include a range of depths that are used and optimized in the inversion. A data window may include the range of depth information that is used as input (e.g., raw measurement 702, well information 706) to generate optimized processing parameters for the inversion window. A processing window may include the range of depth information to use in the numerical inversion process 710, for example, during software focusing.

In an example, the measurement windows may be selected to be based on the current position of a well logging tool. Optimized measurement windows may be selected based on the location, e.g., depth, of a well logging tool and the logging tool's position with respect to a casing. Alternatively, weighting coefficients may be utilized to describe the windows, and also to give relative priority to measurements obtained at specific depths with respect to other depths. For example, low weights at a depth may be used to indicate that depth should not affect the inversion results, or should not affect the processing results as much as the depths where a higher weight is assigned. The position, length or weight distribution of the measurement windows may be selected to minimize casing effects. In particular, the weights or the position (e.g., depth or size) of the windows may be chosen at locations outside of the casing without significantly degrading the performance of processing. For example, at locations close to the casing, the processing window and the weight distribution may be asymmetric with respect to the center of the tool.

In situations where casing position or other parameters (e.g., well information 706) are not precisely known, a best estimation of the parameters may be used as an a-priori value in the inversion process 710. They can be updated as new data becomes available. In situations where the casing position and dimensions (e.g., well information 706) are known, those parameters may be an input to the inversion process 710. In an example, constraints may be utilized in cases where only a range, but not a precise value, for some parameters of the well information 706 is known. For example, if a casing position or diameter is unknown the unknown value may be determined through an inversion analysis. Additionally, unknown parameters of the well information 706 may be an output of the inversion process 710.

Figure 7B:
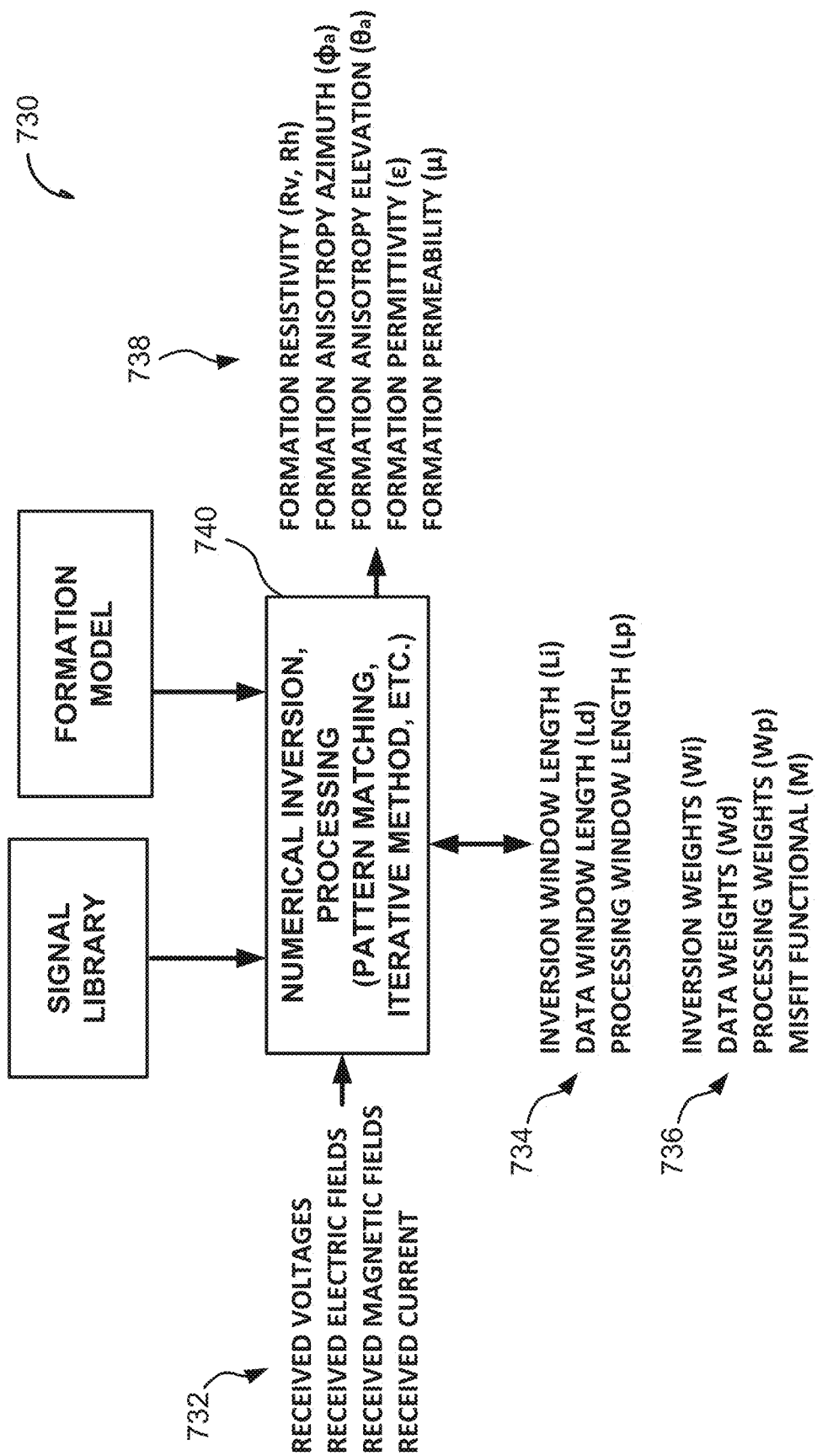
FIG. 7B illustrates an example of a technique, such as a method, including a data processing workflow to improve and standardize radial and vertical resolution of raw measurements.

FIG. 7B illustrates an example of a technique 730, such as a method, including a data processing workflow to improve and standardize radial and vertical resolution of raw measurements 732. In an example where casing position and other well parameters are precisely known, a simpler process than the example depicted in FIG. 7A may be used to avoid measuring data that would be distorted by a casing.

In an example, a software focusing technique at 740 may be applied to the raw measurements 732 to improve and standardize the radial and vertical resolution in the raw measurements 732. The software focusing technique at 740 may processes a range of depths at a time, a length of which is described herein as a processing window length 734. The window length 734 may be selected to be large to account for long shoulder bed effects. However, when the window is near a casing, some part of the range may fall in the zone that is affected by the casing. In order to avoid these casing effects, the processing window length 734 may be selected to be shorter when measurements are taken near the casing. An optimized window may be selected with respect to the center of the well logging tool based on the length of the well logging tool and a distance from the center of the well logging tool to a casing. An example technique includes selecting values that set a size of the window length 734 to be as large as possible (e.g., a maximum measurement length capability of a measurement device) when obtaining measurements outside of the zone that is affected by the casing. The size of the window length 734 may be reduced as the well logging tool approaches the casing termination point, or as the correction of the raw measurements is performed on previously acquired data. In some cases the optimal processing window or the optimal weights can be asymmetric with respect to the center of the tool.

In an example, weighting coefficients 736 may be utilized to describe the window length 734, and also to give relative priority to measurements obtained at specific depths with respect to other depths. For example, low weights at a depth may be used to indicate that depth should not affect the inversion results, or should not affect the processing results as much as the depths where a higher weight is assigned. The position, length or weight distribution of the measurement windows 734 may be selected to minimize casing effects. In particular, the weights or the position (e.g., depth or size) of the windows may be chosen at locations as far away as possible from the casing without significantly degrading the performance of processing. For example, at locations close to the casing, the processing window and the weighting distribution may be asymmetric with respect to the center of the tool.

Figure 7C:
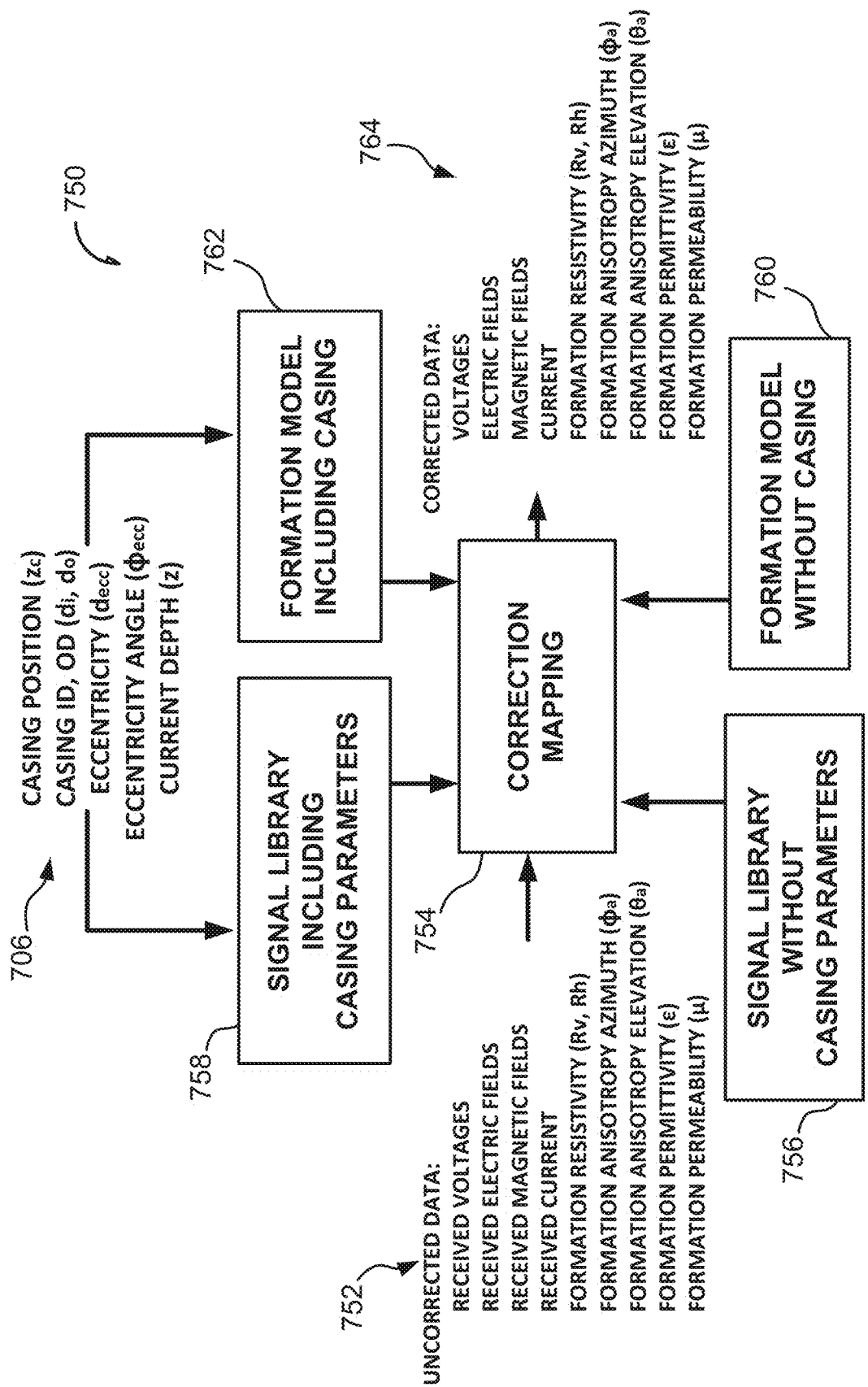
FIG. 7C illustrates an example of a correction mapping technique 750, such as a method, including a data processing workflow to correct measurements utilizing both a formation model that includes casings and a formation model without the casing model.

FIG. 7C illustrates an example of a correction mapping technique 750, such as a method, including a data processing workflow to correct measurements utilizing both a formation model that includes casings and a formation model without the casing model. The correction mapping technique may be applied to correct either, or both, raw or processed measurements.

In an example, a modified processing algorithm may be utilized to remove the effect induced by a casing from the raw uncorrected data 752, a collection of processed measurements, or the inverted formation parameters (e.g., formation parameters 738, of FIG. 7B). The casing effect may be removed by a correction mapping module 754 that processes data between measurements corrected with the formation model including the casing and the formation model without the casing.

The correction mapping 754 may be performed by utilizing two signal libraries, such as a signal library 756 without casing parameters and a signal library 758 that includes casing parameters. An analytical mapping may be generated between the signal library 756 without casing parameters and the signal library 758 that includes casing parameters. The analytical mapping may be applied to raw measurements obtained at locations proximate the casing termination point that are effected by the casing. Similarly, a formation model 760 that does not account for casing effect, and a formation model 762 that does include casing effect may provide input data to correction mapping module 754 and be applied to uncorrected raw data obtained away from the casing termination point and proximate the casing termination point, respectively.

In an alternative example forward models can be used in the place of pre-computed libraries. For example, Equations 1 or 2 may be utilized for the purpose of measurements correction mapping.

$$\text{Corrected-log} = \text{uncorrected-log} + (\text{log-without-casing} - \text{log-with-casing}) \quad \text{Equation 1:}$$

$$\text{Corrected-log} = \text{uncorrected-log} * (\text{log-without-casing} / \text{log-with-casing}) \quad \text{Equation 2:}$$

Figure 8:
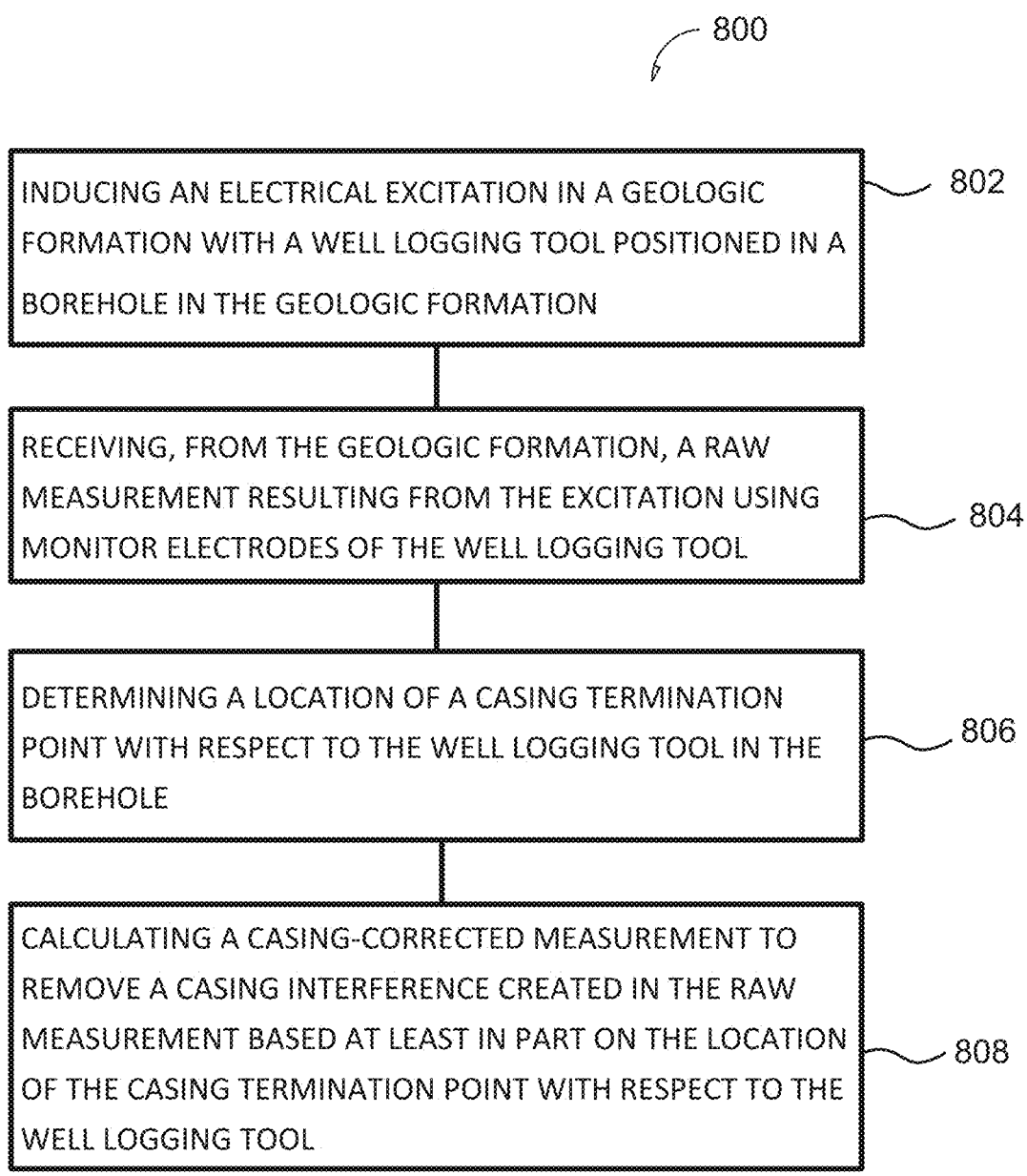
FIG. 8 illustrates an example of a technique, such as a method, for obtaining information indicative of a formation resistivity.

FIG. 8 illustrates an example of a technique 800, such as a method, for obtaining information indicative of a formation resistivity. The technique 800 may begin, for example, at 802, by inducing an electrical excitation in a geologic formation with a well logging tool positioned in a borehole in the geologic formation. The electrical excitation may be generated by transmitting an electrical signal through one or more transmitting antennas or electrodes of the well logging tool.

At 804, technique 800 may continue with receiving, from the geologic formation, a raw measurement corresponding to and resulting from the excitation. The raw measurement may be obtained by using one or more monitor electrodes or antennas of the well logging tool. Other measurement techniques to obtain raw formation measurements may also be utilized.

At 806, technique 800 may continue with determining a location of a casing termination point with respect to the well logging tool in the borehole. For example, a location determination may include calculating a relative position of the well logging tool with respect to the casing based on a depth of the well logging tool from the surface. In another example, location determination may include analyzing the raw measurements resulting from the excitation and noting a change in the raw measurements corresponding to the logging tool transitioning out of the casing.

At 808, the technique 800 may terminate by obtaining a corrected measurement to remove a casing interference created in the raw measurement. In an example, obtaining the corrected measurement may include obtaining the corrected raw measurements based at least in part on the location of the casing termination point with respect to the well logging tool, and processing corrected raw measurements to obtain a casing-corrected processed measurement. In another example, obtaining the casing-corrected measurement may include processing the raw measurement to obtain a processed measurement, and correcting the processed measurement to obtain a casing-corrected processed measurement.

In an example, technique 800 may further include determining a resistivity of the formation at locations above and/or below the casing termination point using information about the electrical excitation, and the raw measurement obtained at 804.

In an example, technique 800 may further include applying a signal library of modeled measurements to the obtained raw measurements in order to eliminate a casing effect on the raw measurements. The signal library of modeled raw measurements may correspond to formation and casing parameters that include a location of the well logging tool in the borehole with respect to the casing termination point in order to accurately determine a formation resistivity. The formation and casing parameters may include at least one of casing diameter, borehole diameter, mud resistivity, formation resistivity anisotropy, and formation radial resistivity profile.

In an example, technique 800 may further include applying a signal library of modeled measurements to the obtained raw measurements in order to eliminate a casing effect on the raw measurements, the elimination of the casing effect being based at least in part on the location of the well logging tool in the borehole with respect to the casing termination point. The signal library of modeled raw measurements may include a plurality of casing position and casing interference properties that correspond to raw measurements obtained by the well logging tool at a location proximate to the casing termination point.

FIG. 9 illustrates an example of a drilling apparatus 900, such as including a measure-while-drilling (MWD) or log-while-drilling (LWD) capability. The illustrative example of FIG. 9 may include apparatus such as shown in FIGS. 1 through 2, or may be used with techniques discussed in relation to FIGS. 7A through 8. A drilling rig or platform 902 generally includes a derrick 904 or other supporting structure, such as including or coupled to a hoist 906. The hoist 906 may be used for raising or lowering equipment or other apparatus such as drill string 908. The drill string 908 may access a borehole 916, such as through a well head 912. The lower end of the drill string 908 may include various apparatus, such as a drill head 914, such as to provide the borehole 916.

A drilling fluid or "mud" may be circulated in the annular region around the drill head 914 or elsewhere, such as provided to the borehole 916 through a supply pipe 922, circulated by a pump 920, and returning to the surface to be captured in a retention pit 624 or sump. Various subs or tool assemblies may be located along the drill string 908, such as include a bottom hole assembly (BHA) 926 or a second sub 928.

As the BHA 926 or second sub 928 pass through various regions of a formation 918, information may be obtained. For example, the BHA 926, or the second sub 928, may include apparatus such as shown in the examples of FIG. 1 or 2, such as to obtain array laterolog measurements for use in determining an apparent formation 918 resistivity. The second sub 928 may include wireless telemetry or logging capabilities, or both, such as to transmit or later provide information indicative of a formation resistivity to operators on the surface or for later access in evaluation of formation 918 properties. For example, portions 930 of the apparatus 900 at the surface may include one or more of wireless telemetry, processor circuitry, or memory facilities, such as to support log-while-drilling (LWD) or measurement-while-drilling (MWD) operations.

FIG. 10 illustrates an example of a wireline logging apparatus. The illustrative example of FIG. 10 may include apparatus such as shown in FIGS. 1 through 2, or may be used with techniques discussed in relation to FIGS. 7A through 8. Similar to the example of FIG. 9, a hoist 906 may be included as a portion of a platform 902, such as coupled to a derrick 904, and used to raise or lower equipment such as a wireline sonde 1050 into or out of a borehole. In this wireline example, a cable 1042 may provide a communicative coupling between a logging facility 1044 (e.g., including a processor circuit 1045 or other storage or control circuitry) and the sonde 1050. In this manner, information about the formation 918 may be obtained, such as using an array laterolog tool included as at least a portion of the sonde 1050 as discussed in other examples herein (e.g., a laterolog tool including apparatus 100 as in FIG. 1 or apparatus 200 as in FIG. 2).

For purposes of illustration, the examples of FIGS. 9 and 10 show a vertically-oriented borehole configuration. However, the apparatus and techniques described herein may also be used in other borehole configurations, such as a borehole including a horizontal penetration direction, or an oblique borehole configuration, for example. The examples of FIGS. 9 and 10 also generally illustrate land-based examples. But, apparatus and techniques described herein may be used in offshore environments as well, such as for subsea operations. In particular, offshore or subsea operations may include use of wireline or LWD/MWD apparatus and techniques including aspects of the examples herein.

The accompanying drawings that form a part of this application, show by way of illustration, and not of limitation, specific example embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Thus, although specific example embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. The novel subject matter herein is defined only by all current or future claims supported by this specification, and the equivalents of such claims.

The claimed invention is:

1. A method for obtaining information indicative of casing-corrected formation properties, comprising:
  positioning a well logging tool within a borehole in a subterranean geologic formation;
  inducing via an electrode array of the well logging tool at least one of a voltage and a current in the subterranean geological formation using the well logging tool;
  receiving a raw measurement at one or more monitor electrodes of the well logging tool corresponding to the at least one induced voltage and current;
  and calculating the casing-corrected formation properties with casing interference removed using the received raw measurement and an inversion process; wherein the inversion process includes measuring a difference between the received raw measurement and modeled measurements, wherein a weighting is associated with the received raw measurement, the weighting being based on a depth of the well logging tool at which the received raw measurement is measured with respect to a casing termination point, and wherein the weighting indicates a level by which the received raw measurement affects inversion results of the inversion process; and determining a model indicative of the casing-corrected formation properties based on the difference.

2. The method of claim 1, wherein calculating the casing-corrected formation properties comprises:
analyzing raw measurements as the well logging tool is positioned within the borehole; and
identifying the casing termination point based, at least in part, on detection of a change in the raw measurements.

3. The method of claim 2, wherein calculating the casing-corrected formation properties comprises:
applying a signal library of modeled measurements to the raw measurements, the signal library of modeled measurements corresponding to formation and casing parameters including formation resistivity and at least one of location of the well logging tool in the borehole with respect to the casing termination point, casing diameter, borehole diameter, mud resistivity, formation resistivity anisotropy, and formation radial resistivity profile.

4. The method of claim 1, wherein calculating the casing-corrected formation properties comprises:
selecting optimized processing parameters based at least in part on a position of the well logging tool within the borehole; and
processing the raw measurement to obtain the casing-corrected formation properties using the optimized processing parameters.

5. The method of claim 4, wherein selecting the optimized processing parameters comprises selecting a window defining a range of depths with respect to the casing termination point in the borehole based on the position of the well logging tool with respect to the casing termination point in the borehole.

6. The method of claim 5, further comprising:
optimizing a weight of the window with respect to a center of the well logging tool.

7. The method of claim 6, wherein optimizing the weight of the window with respect to the center of the well logging tool comprises maximizing a length of the window such that the casing termination point is not included in the window.

8. The method of claim 1, wherein calculating the casing-corrected formation properties comprises:
processing the raw measurement to obtain a processed measurement; and
correcting the processed measurement to obtain the casing-corrected formation properties.

9. The method of claim 8, wherein processing the raw measurement comprises applying a signal library of modeled processed measurements, the signal library of modeled processed measurements including formation resistivity and at least one of location of the well logging tool in the borehole with respect to the casing termination point, casing diameter, borehole diameter, mud resistivity, formation resistivity anisotropy, and formation radial resistivity profile.

10. The method of claim 9, wherein determining the location of the well logging tool in the borehole with respect to the casing termination point comprises determining a relative position of the well logging tool with respect to the casing termination point based at least in part on the depth of the well logging tool.

11. The method of claim 1, further comprising:
determining a resistivity of the subterranean geological formation at locations above the casing termination point using information about an electrical excitation and the raw measurement.

12. The method of claim 1, further comprising:
determining a resistivity of the subterranean geological formation at locations below the casing termination point using information about an electrical excitation and the raw measurement.

13. The method of claim 1, wherein the well logging tool is part of a bottom-hole assembly that includes resistivity logging tools, or a through bit logging assembly.

14. The method of claim 1, wherein the well logging tool is part of a wireline tool string.

15. The method of claim 1, wherein the well logging tool is an induction tool.

16. The method of claim 1, wherein the well logging tool is a galvanic tool.

17. The method of claim 1, wherein raw measurement correction is performed during a logging operation.

18. The method of claim 1, further comprising storing the raw measurement from monitor electrodes obtained at a plurality of positions proximate to the casing termination point of the borehole in a reading log.

19. The method of claim 1, wherein the weighing is asymmetric based on a center of the well logging tool.

20. The method of claim 1, wherein a drilling operation is performed in the subterranean geological formation based, at least in part, on the casing-corrected formation properties.

21. A non-transitory processor-readable medium including instructions that, when executed by one or more processors, cause the one or more processors to:
determine a location of a casing termination point with respect to a well logging tool positioned in a subterranean geologic formation;
induce at least one of a voltage and a current in the subterranean geological formation using an electrode array of the well logging tool;
receive a raw measurement at one or more monitor electrodes of the well logging tool corresponding to the at least one induced voltage and current; and
calculate casing-corrected formation properties with casing interference removed using the received raw measurement and an inversion process, wherein the inversion process includes measuring a difference between the received raw measurement and modeled measurements, wherein a weighting is associated with the received raw measurement, the weighting being based on a depth of the well logging tool at which the received raw measurement is measured with respect to the casing termination point, and wherein the weighting indicates a level by which the received raw measurement affects inversion results of the inversion process; and determining a model indicative of the casing-corrected formation properties based on the difference.

22. The non-transitory processor-readable medium of claim 21, the instructions to calculate the casing-corrected formation properties comprise instructions to:
process the raw measurement to obtain a processed measurement; and
correct the processed measurement to obtain the casing-corrected formation properties.

23. The non-transitory processor-readable medium of claim 21, further comprise instructions to:

determine a resistivity of the subterranean geological formation at locations above the casing termination point using information about an electrical excitation and the raw measurement.

24. The non-transitory processor-readable medium of claim 21, further comprise instructions to:
determine a resistivity of the subterranean geological formation at locations below the casing termination point using information about an electrical excitation and the raw measurement.

25. The non-transitory processor-readable medium of 21, wherein the instructions for weighting further comprises asymmetric weighting based on a center of the well logging tool.

26. The non-transitory processor-readable medium of 21, wherein a drilling operation is performed in the subterranean geological formation based, at least in part, on the casing-corrected formation properties.

27. A method for correcting a formation conductivity measurement comprising:
determining a location of a casing termination point based, at least in part, on a raw measurement received at one or more monitor electrodes of a well logging tool in response to an electrical excitation from one or more monitor electrodes of the well logging tool in a borehole which is partially lined by casing and in a geologic formation through which the borehole extends; and
obtaining casing-corrected formation properties with casing interference removed using the received raw measurement and an inversion process, wherein the inversion process includes measuring a difference between the received raw measurement and modeled measurements, wherein a weighting is associated with the received raw measurement, the weighting being based on a depth of the well logging tool at which the received raw measurement is measured with respect to the casing termination point, and wherein the weighting indicates a level by which the received raw measurement affects inversion results of the inversion process; and determining a model indicative of the casing-corrected formation properties based on the difference.

28. The method of claim 27, further comprising:
determining a resistivity of the geological formation at locations above the casing termination point using information about the electrical excitation and the raw measurement.

29. The method of claim 27, further comprising:
determining a resistivity of the geological formation at locations below the casing termination point using information about the electrical excitation and the raw measurement.

30. The method of claim 27, further comprising:
applying a signal library of modeled raw measurements to the raw measurement, the signal library of modeled raw measurements corresponding to formation and casing parameters comprising location of the well logging tool in the borehole with respect to the casing termination point and formation resistivity.

31. The method of claim 30, further comprising: selecting a window defining a range of depths with respect to the casing termination point in the borehole based on the location of the well logging tool in the borehole with respect to the casing termination point; and optimizing the window with respect to a center of the well logging tool includes maximizing a length of the window such that the casing termination point is not included in the window.

32. The method of claim 27, wherein a drilling operation is performed in the geological formation based, at least in part, on the casing-corrected formation properties.

33. An apparatus, comprising:
a well logging tool body;
an array of electrodes located on the well logging tool body, the array of electrodes including respective excitation electrodes and respective monitor electrodes, coupled from a borehole to a geologic formation through which the borehole extends when the well logging tool body is located within the borehole; and
a processor circuit coupled to the excitation electrodes using an excitation circuit, and coupled to the monitor electrodes using a measurement circuit;
a non-transitory machine-readable medium having program code executable by the processor circuit to cause the apparatus to:
control the excitation circuit to generate an electrical excitation from the well logging tool body coupled to the geologic formation through the excitation electrodes on the well logging tool body;
control the measurement circuit to receive from the geologic formation induced voltages resulting from the electrical excitation using the monitor electrodes; and
correct the induced voltages to remove a casing interference created in the induced voltages based, at least in part, on a location of the well logging tool body with respect to a casing end point;
wherein the correction comprises calculating casing-corrected formation properties with the casing interference removed using the induced voltages and an inversion process;
wherein the inversion process includes measuring a difference between the induced voltages and modeled measurements,
wherein a weighting is associated with the induced voltages, the weighting being based on a depth of the well logging tool body at which the induced voltages are measured with respect to a casing termination point, and wherein the weighting indicates a level by which the induced voltages affect inversion results of the inversion process; and
determining a model indicative of the casing-corrected formation properties based on the difference.

34. The apparatus of claim 33, wherein the well logging tool body is part of a wireline tool string.

35. The apparatus of claim 33, wherein the well logging tool body is an induction tool.

36. The apparatus of claim 33, wherein the well logging tool body is a galvanic tool.

37. The apparatus of claim 33, wherein a drilling operation is performed in the geological formation based, at least in part, on the casing-corrected formation properties.

38. A non-transitory processor-readable medium including instructions that, when performed by a processor circuit, cause the processor circuit to:
induce at least one of a voltage and a current in a subterranean geological formation using an electrode array of a well logging tool within a borehole in the subterranean geologic formation;
receive a raw measurement at one or more monitor electrodes of the well logging tool corresponding to the at least one induced voltage and current; and calculate a casing-corrected formation properties with casing interference removed using the received raw measurement and an inversion process, wherein the inversion process includes
measuring a difference between the received raw measurement and modeled measurements, wherein a weighting is associated with the received raw measurement, the weighting being based on a depth of the well logging tool at which the received raw measurement is measured with respect to a casing termination point, and wherein the weighting indicates a level by which the received raw measurement affects inversion results of the inversion process; and determining a model indicative of the casing-corrected formation properties based on the difference.

39. The non-transitory processor-readable medium of 38, wherein a drilling operation is performed in the subterranean geological formation based, at least in part, on the casing-corrected formation properties.

40. A non-transitory processor-readable medium including instructions that, when performed by a processor circuit, cause the processor circuit to:
determine a location of a casing termination point based at least in part of a raw measurement resulting from an electrical excitation using monitor electrodes of a well logging tool in a borehole, the raw measurement received in response to the electrical excitation from an electrode array of the well logging tool in the borehole to a geologic formation through which the borehole extends; and
obtain casing-corrected formation properties with casing interference removed using the received raw measurement and an inversion process; wherein the inversion process includes measuring a difference between the received raw measurement and modeled measurements, wherein a weighting is associated with the received raw measurement, the weighting being based on a depth of the well logging tool at which the received raw measurement is measured with respect to the casing termination point, and wherein the weighting indicates a level by which the raw measurement affects inversion results of the inversion process; and determining a model indicative of the casing-corrected formation properties based on the difference.

41. The non-transitory processor-readable medium of 40, wherein a drilling operation is performed in the geological formation based, at least in part, on the casing-corrected formation properties.

* * * * *